United States Patent
Chuck et al.

(10) Patent No.: US 10,641,207 B2
(45) Date of Patent: May 5, 2020

(54) AIR FLOW DEFLECTOR ASSEMBLY FOR A THRUST REVERSER SYSTEM FOR REDUCING RE-INGESTION OF REVERSE EFFLUX AIR FLOW AND METHOD FOR THE SAME

(71) Applicant: The Boeing Company, Chicago, IL (US)

(72) Inventors: Chen Chuck, Mercer Island, WA (US); Suk C. Kim, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 15/656,568

(22) Filed: Jul. 21, 2017

(65) Prior Publication Data
US 2019/0024609 A1    Jan. 24, 2019

(51) Int. Cl.
F02K 1/72 (2006.01)
B64D 29/06 (2006.01)
B64D 27/18 (2006.01)
F02K 1/76 (2006.01)

(52) U.S. Cl.
CPC ............... *F02K 1/72* (2013.01); *B64D 27/18* (2013.01); *B64D 29/06* (2013.01); *F02K 1/763* (2013.01); *F05D 2220/323* (2013.01); *F05D 2240/14* (2013.01)

(58) Field of Classification Search
CPC ..... F02K 1/72; F02K 1/70; F02K 1/62; F02K 1/625; F02K 1/563; F02K 1/763
See application file for complete search history.

(56) References Cited

U.S. PATENT DOCUMENTS

| | | | |
|---|---|---|---|
| 3,640,468 A | 2/1972 | Searle et al. | |
| 5,819,528 A * | 10/1998 | Masson | F02K 1/70 60/226.2 |
| 6,546,715 B1 | 4/2003 | Blevins et al. | |
| 2009/0193789 A1* | 8/2009 | Pero | F02K 1/70 60/226.2 |
| 2014/0117106 A1 | 5/2014 | Acheson et al. | |
| 2015/0097055 A1* | 4/2015 | Aten | F02K 1/72 239/265.19 |
| 2016/0010558 A1* | 1/2016 | Hussain | F01D 17/105 415/175 |
| 2016/0341150 A1* | 11/2016 | Chuck | F02K 1/72 |
| 2016/0363097 A1* | 12/2016 | Foutch | F02K 1/72 |
| 2017/0152811 A1 | 6/2017 | Acheson et al. | |

* cited by examiner

*Primary Examiner* — Andrew H Nguyen

(57) ABSTRACT

There is provided an air flow deflector apparatus for a thrust reverser system of an engine of an air vehicle. The air flow deflector apparatus is movable between a stowed non-reversing position and a deployed thrust reversing position, to deflect an air flow out of the engine, and to provide an effective reverse thrust for the thrust reverser system. There is further provided an air flow deflector assembly for a structure. The air flow deflector assembly has the air flow deflector apparatus, an extender member, and a recessed housing disposed in the structure. The air flow deflector assembly has an air flow deflector actuator that moves the air flow deflector apparatus between a stowed position and a deployed position adjacent to a reverse efflux air flow exit portion of the structure. The air flow deflector assembly deflects a reverse efflux air flow away from being re-ingested into the structure.

26 Claims, 11 Drawing Sheets

AIR FLOW DEFLECTOR ASSEMBLY FOR A THRUST REVERSER SYSTEM FOR REDUCING RE-INGESTION OF REVERSE EFFLUX AIR FLOW AND METHOD FOR THE SAME

BACKGROUND

1) Field of the Disclosure

The disclosure relates generally to thrust reverser systems and methods for engines used on aircraft, and more particularly, to air flow deflector assemblies for thrust reverser systems and methods for gas turbine engines used on aircraft, to reduce re-ingestion of reverse efflux air flow by the engines.

2) Description of Related Art

Vehicles, such as commercial and military jet aircraft, use thrust reversers on the aircraft's jet engines, such as gas turbine engines, to block forward thrust or redirect the forward thrust into a reverse thrust, in order to reduce the aircraft's speed just after landing, to reduce wear on the aircraft's brakes, and to enable shorter landing distances. An aircraft thrust reverser is typically deployed, after landing, at a high landing speed, e.g., approximately 115-120 knots, and is typically stowed or retracted, after landing, at a low landing speed, e.g., approximately 50-60 knots. At such lower landing speed, reverser efflux air flow may pose a potential re-ingestion risk, if it is re-ingested at an air flow inlet of the engine. Prolonged re-ingestion of reverser efflux air flow at the air flow inlet of the engine may cause damage to the engine fan, the engine fan blades, and/or other internal engine parts, due to the increasing temperature of the re-ingested reverser efflux air flow, as it continuously re-circulates in and out of the engine. Such damage to the engine fan, the engine fan blades, and/or other internal engine parts may result in costly repair or replacement of the damaged parts.

Known devices, systems, and methods exist for reducing re-ingestion of reverser efflux air flow at the air flow inlet of the engine. For example, cascade-type thrust reverser systems may use cascade vanes on the sides of an engine nacelle to direct reverser efflux air flow. However, to avoid or minimize the risk of re-ingestion of reverse efflux air flow, certain cascade vanes, such as forward turning cascade vanes, may require a unique design, such as limited forward turning angles, which may be lower or higher angles than standard cascade vanes without a unique design. The lower or higher angles of these unique cascade vanes may lower the amount of reverse thrust the engine may have. Moreover, such unique cascade vanes may be costly to build and maintain.

Thus, there is a continuing need for an improved air flow deflector assembly for thrust reverser systems and methods for aircraft engines to reduce re-ingestion of reverse efflux air flow by the aircraft engines, to reduce the amount of unique cascade vanes required, and to provide advantages over known assemblies, systems, and methods.

SUMMARY

This need for an improved air flow deflector assembly for thrust reverser systems and methods for aircraft engines is satisfied. As discussed in the below detailed description, examples of the improved air flow deflector assembly for thrust reverser systems and methods for aircraft engines may provide significant advantages over existing assemblies, systems and methods.

In a disclosed example, there is provided an air flow deflector apparatus for a thrust reverser system of an engine of an air vehicle. The air flow deflector apparatus is movable between a stowed non-reversing position and a deployed thrust reversing position, to deflect an air flow out of the engine, and to provide an effective reverse thrust for the thrust reverser system.

In another disclosed example, there is provided an air flow deflector assembly for a structure. The air flow deflector assembly comprises an air flow deflector apparatus movable between a stowed position and a deployed position. The air flow deflector assembly further comprises an extender member having a first end coupled to the air flow deflector apparatus.

The air flow deflector assembly further comprises a recessed housing disposed in a surface of the structure. The recessed housing has an interior opening configured to stow the air flow deflector apparatus and the extender member within the recessed housing in the stowed position.

The air flow deflector assembly further comprises an air flow deflector actuator comprising an actuating portion coupled to a second end of the extender member and coupled to the recessed housing, and comprising a fixed handle portion coupled to an interior portion of the structure. The air flow deflector actuator is configured to move the air flow deflector apparatus between the stowed position within the recessed housing, and the deployed position adjacent to a reverse efflux air flow exit portion of the structure.

The air flow deflector apparatus, the extender member, the recessed housing, and the air flow deflector actuator are assembled to form the air flow deflector assembly for the structure. The air flow deflector assembly is configured to deflect a reverse efflux air flow away from being re-ingested into the structure.

In another disclosed example, there is provided an air vehicle having an air flow deflector assembly for reducing re-ingestion of a reverse efflux air flow. The air vehicle comprises a fuselage, at least one wing connected to the fuselage, and at least one engine coupled to the at least one wing. The at least one engine has a nacelle and has the air flow deflector assembly for a thrust reverser system.

The air flow deflector assembly comprises an air flow deflector apparatus movable between a stowed non-reversing position and a deployed thrust reversing position. The air flow deflector assembly further comprises an extender member having a first end coupled to the air flow deflector apparatus.

The air flow deflector assembly further comprises a recessed housing disposed in a surface of the nacelle. The recessed housing has an interior elongated channel opening configured to stow the air flow deflector apparatus and the extender member within the recessed housing in the stowed non-reversing position.

The air flow deflector assembly further comprises an air flow deflector actuator comprising an actuating portion coupled to a second end of the extender member and coupled to the recessed housing, and comprising a fixed handle portion coupled to an interior portion of the nacelle. The air flow deflector actuator is configured to move the air flow deflector apparatus between the stowed non-reversing position within the recessed housing, and the deployed thrust reversing position adjacent to a reverse efflux air flow exit portion of the engine.

When the air flow deflector apparatus is in the deployed thrust reversing position, upon landing of the air vehicle, the air flow deflector apparatus deflects the reverse efflux air flow in an outward direction away from the at least one engine, to produce a deflected reverse efflux air flow. This thereby reduces re-ingestion of the reverse efflux air flow at an air flow inlet of the at least one engine.

In another disclosed example, there is provided a method for reducing re-ingestion of a reverse efflux air flow in an engine of an air vehicle. The method comprises the step of coupling an air flow deflector assembly, for a thrust reverser system, to a nacelle of the engine.

The air flow deflector assembly comprises an air flow deflector apparatus movable between a stowed non-reversing position and a deployed thrust reversing position. The air flow deflector assembly further comprises an extender member having a first end coupled to the air flow deflector apparatus.

The air flow deflector assembly further comprises a recessed housing disposed in a surface of the nacelle. The recessed housing has an interior opening configured to stow the air flow deflector apparatus and the extender member within the recessed housing in the stowed non-reversing position. The air flow deflector assembly further comprises an air flow deflector actuator comprising an actuating portion coupled to a second end of the extender member and coupled to the recessed housing, and comprising a fixed handle portion coupled to an interior portion of the nacelle.

The method further comprises the step of using the air flow deflector assembly, upon landing of the air vehicle, and upon deployment of a thrust reverser of the thrust reverser system, to deflect the reverse efflux air flow in an outward direction away from the engine.

The method further comprises the step of producing a deflected reverse efflux air flow that is away from being re-ingested at an air flow inlet of the engine, and thus reducing re-ingestion of the reverse efflux air flow at the air flow inlet of the engine.

The features, functions, and advantages that have been discussed can be achieved independently in various examples of the disclosure or may be combined in yet other examples further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary examples, but which are not necessarily drawn to scale, wherein.

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Figure 1:
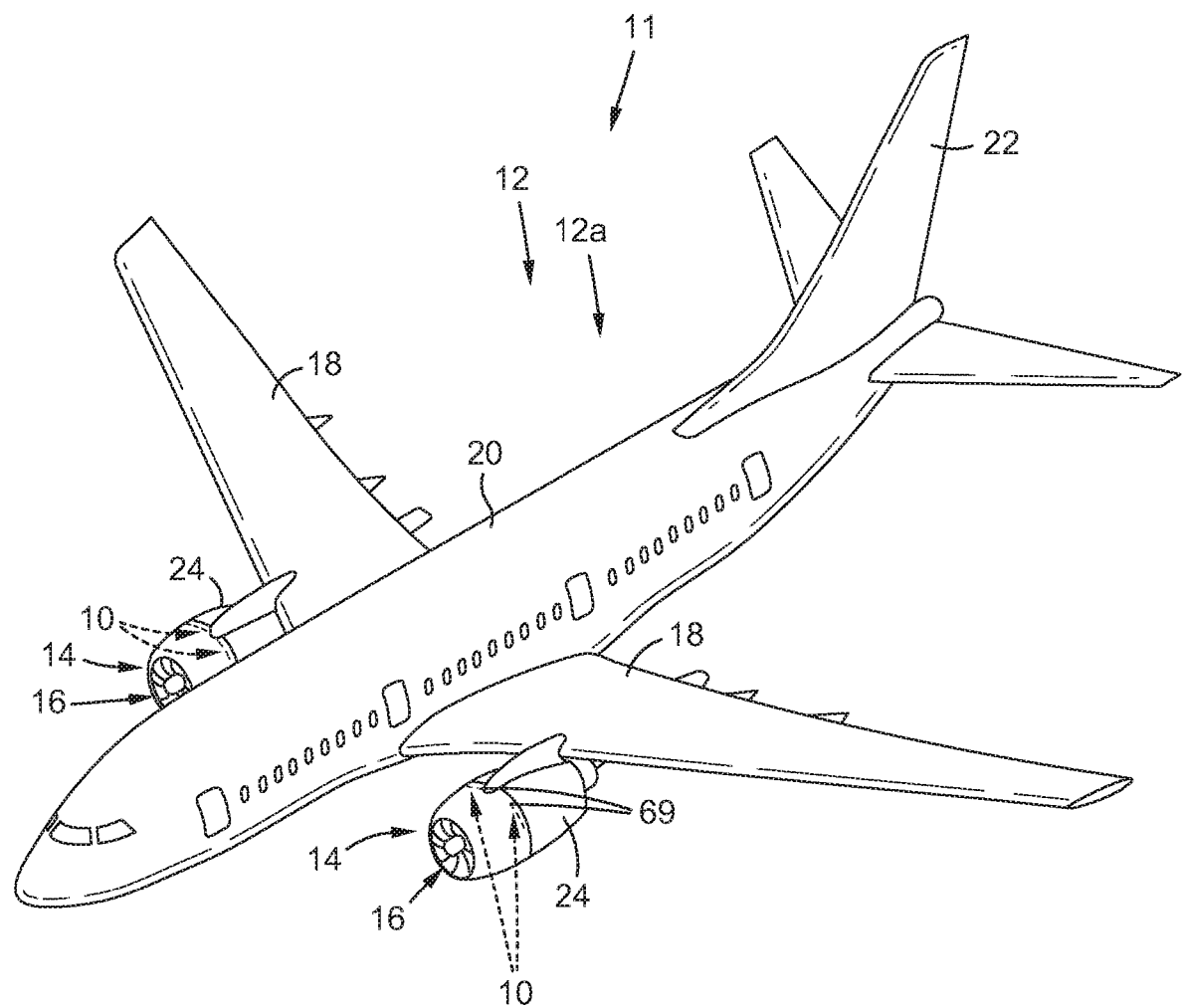
FIG. 1 is an illustration of a perspective view of a vehicle, such as an air vehicle, that may incorporate a disclosed example of an air flow deflector assembly for a thrust reverser system.

Now referring to the Figures, FIG. 1 is an illustration of a perspective view of a vehicle 11, such as an air vehicle 12, for example, an aircraft 12a, that may incorporate a disclosed example of an air flow deflector assembly 10 for a thrust reverser system 24. As shown in FIG. 1, the vehicle 11, such as the air vehicle 12, for example, the aircraft 12a, comprises two nacelles 14 which shroud or surround two engines 16, respectively, for example, two gas turbine engines. The vehicle 11, such as the air vehicle 12 (see FIG. 1), for example, the aircraft 12a (see FIG. 1), further comprises wings 18 (see FIG. 1), a fuselage 20 (see FIG. 1), and a tail 22 (see FIG. 1). As shown in FIG. 1, each engine 16 and nacelle 14 includes the air flow deflector assembly 10 for the thrust reverser system 24. In particular, as shown in FIG. 1, each engine 16 and nacelle 14 includes two (2) air flow deflector assemblies 10 for the thrust reverser system 24, where the two (2) air flow deflector assemblies 10 are positioned in a circumferentially spaced apart relationship 69 relative to each other. Alternatively, each engine 16 and nacelle 14 may include one (1) air flow deflector assembly 10 for the thrust reverser system 24, or may include another suitable number of air flow deflector assemblies 10, such as more than two (2) air flow deflector assemblies 10.

Figure 3:
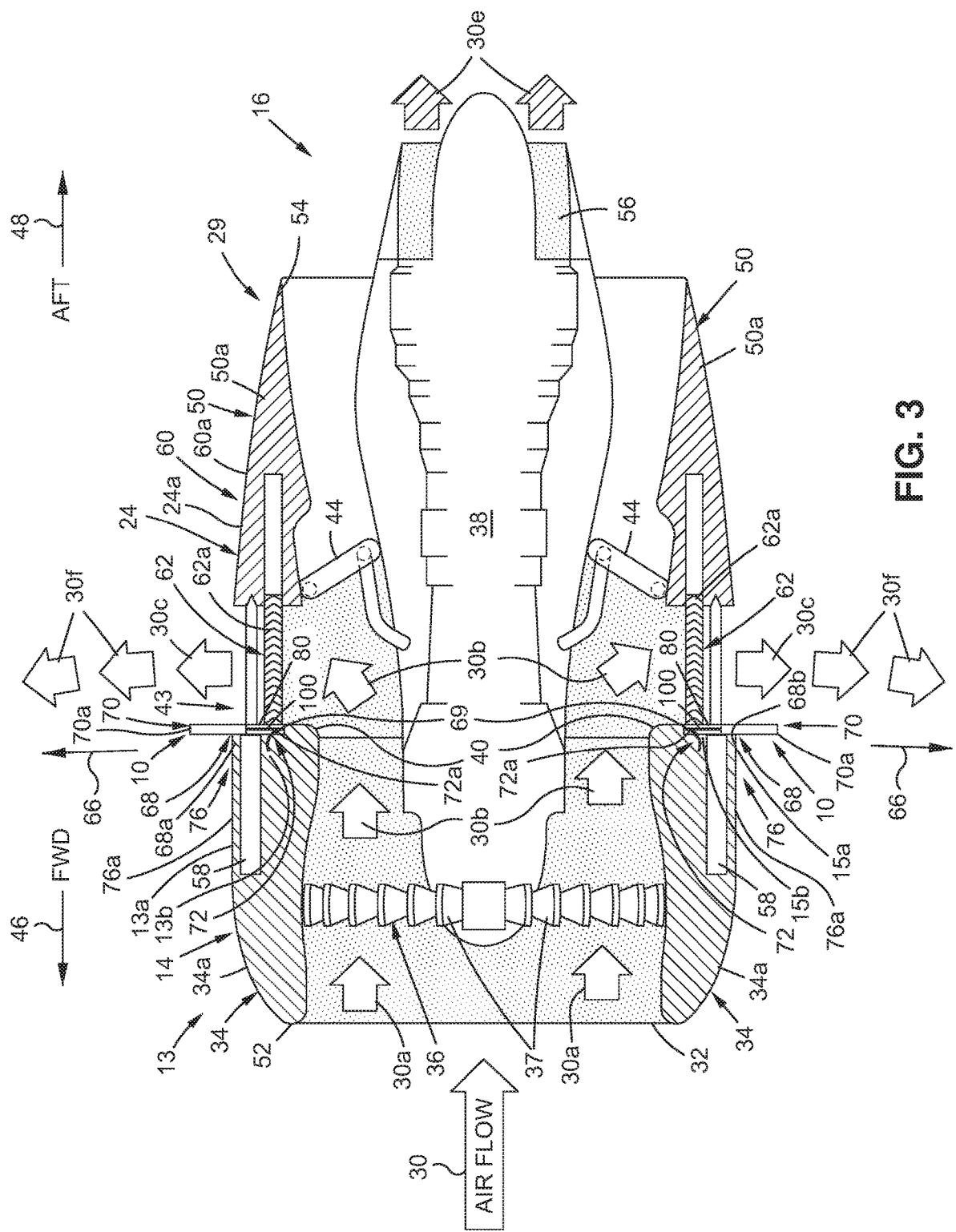
FIG. 3 is an illustration of a top sectional view of an engine having disclosed examples of an air flow deflector apparatus and an air flow deflector assembly for a thrust reverser system.

As used herein, "thrust reverser system" and "thrust reverser" mean a system configured to reverse or divert an aircraft engine's thrust, so that it is directed in a forward direction 46 (see FIG. 3), rather than in an aft direction 48 (see FIG. 3). Thrust reverser systems 24 (see FIG. 1) help to slow down the air vehicle 12 (see FIG. 1), such as the aircraft 12a (see FIG. 1), just after landing or touchdown, help to reduce wear on the brakes, and help to enable shorter landing distances. As used herein, the "landing distance" means a ground roll of the air vehicle 12 (see FIG. 7), such as the aircraft 12a (see FIG. 7), from the point of landing or touchdown to a complete stop or rest.

Figure 2:
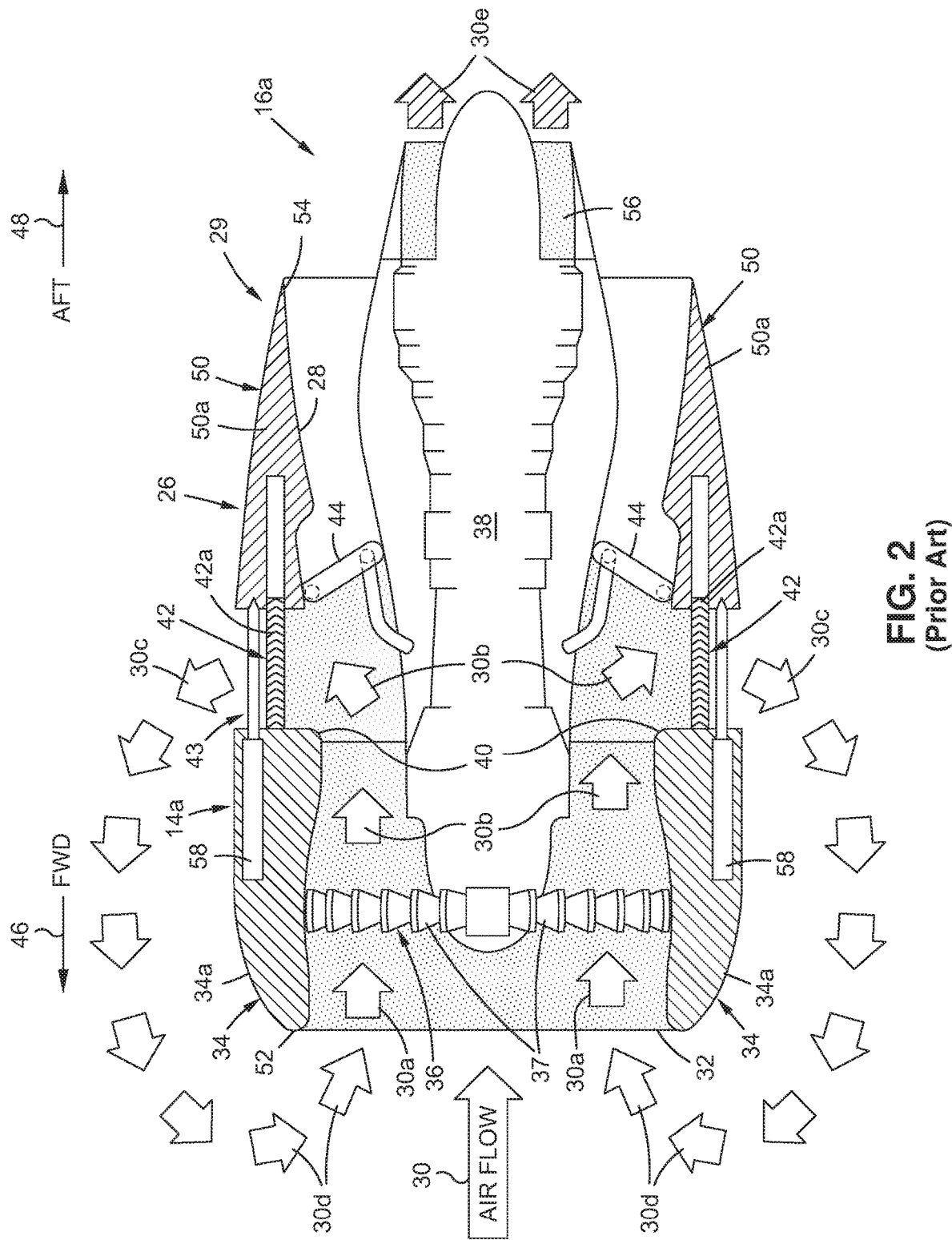
FIG. 2 is an illustration of a top sectional view of a known engine with a known cascade-type thrust reverser system.

Now referring to FIG. 2, FIG. 2 is an illustration of a top sectional view of a known engine 16a with a known cascade-type thrust reverser system 26 having a thrust reverser 28 shown in a deployed reverse thrust position 29. As shown in FIG. 2, air flow 30, such as in the form of intake air flow 30a, flows into a nacelle 14a at an air flow inlet 32 of a fixed portion 34 of the nacelle 14a, such as in the form of an inlet cowl 34a. The intake air flow 30a (see FIG. 2) flows through a fan 36 (see FIG. 2) and a plurality of fan blades 37 (see FIG. 2) of the fan 36 to become fan air flow 30b (see FIG. 2). As shown in FIG. 2, the fan air flow 30b flows around the sides of an engine core 38 and around a thrust reverser bullnose fairing 40.

As further shown in FIG. 2, the fan air flow 30b flows through cascade members 42, such as in the form of cascade vanes 42a, and exits the nacelle 14a, as reverse efflux air flow 30c, at a reverse efflux air flow discharge portion 43 of the engine 16a. During thrust reversal, instead of being ejected from the rear of the engine 16a (see FIG. 2) to generate forward thrust, the fan air flow 30b (see FIG. 2) is blocked by blocker doors 44 (see FIG. 2) inside the engine 16a (see FIG. 2) and directed as reverse efflux air flow 30c outside the nacelle 14a (see FIG. 2), in a forward direction 46 (see FIG. 2), via the cascade members 42 (see FIG. 2), to generate a reverse thrust. However, when the thrust reverser 28 (see FIG. 2) is in the deployed reverse thrust position 29 (see FIG. 2) during landing or touchdown, and the aircraft 12a (see FIG. 1) is at a low landing speed (e.g., 50-60 knots), there is a risk of re-ingestion reverse efflux air flow 30d and re-ingestion at the air flow inlet 32 (see FIG. 2).

The nacelle 14a (see FIG. 2) includes the fixed portion 34 (see FIG. 2), such as in the form of inlet cowl 34a (see FIG. 2), at a forward end 52 (see FIG. 2) of the nacelle 14a (see FIG. 2), and the nacelle 14a (see FIG. 2) further includes a translating portion 50 (see FIG. 2), such as in the form of a translating sleeve 50a (see FIG. 2), at an aft end 54 (see FIG. 2) of the nacelle 14a (see FIG. 2). As shown in FIG. 2, exhaust air flow 30e exits from a nozzle portion 56 of the engine 16a at the aft end 54 of the nacelle 14a. FIG. 2 further shows thrust reverser actuators 58 for actuating the translating sleeve 50a in an aft direction 48.

Now referring to FIG. 3, disclosed examples of an air flow deflector apparatus 70 and an air flow deflector assembly 10 for a thrust reverser system 24, such as a re-ingestion reducing thrust reverser system 24a, of an engine 16 of an air vehicle 12 is provided. FIG. 3 is an illustration of a top sectional view of an engine 16 having disclosed examples of the air flow deflector apparatus 70 and the air flow deflector assembly 10 for a thrust reverser system 24, such as the re-ingestion reducing thrust reverser system 24a.

As shown in FIG. 3, the engine 16 and a structure 13, such as a nacelle 14, include the air flow deflector assembly 10 including the air flow deflector apparatus 70, for the thrust reverser system 24. In particular, as shown in FIG. 3, the engine 16 and nacelle 14 include two (2) air flow deflector assemblies 10 for the thrust reverser system 24, where the two (2) air flow deflector assemblies 10 are positioned in a circumferentially spaced apart relationship 69 relative to each other. Alternatively, the engine 16 and nacelle 14 may include one (1) air flow deflector assembly 10 for the thrust reverser system 24, or may include another suitable number of air flow deflector assemblies 10, such as more than two (2) air flow deflector assemblies 10.

The air flow deflector assembly 10 is preferably positioned at a location 68 (see FIGS. 3, 4A) of the structure 13, such as the nacelle 14 (see FIGS. 3, 4A), that is forward of a plurality of cascade members 62 (see FIGS. 3, 4A), such as in the form of cascade vanes 62a, of the engine 16 (see FIGS. 3, 4A), and that is downstream of a thrust reverser bullnose fairing 40 (see FIG. 3). As shown in FIG. 3, one air flow deflector assembly 10 may be positioned at a first location 68a of the structure 13, such as the nacelle 14, and another air flow deflector assembly 10 may be spaced apart and positioned at a second location 68b of the structure 13, such as the nacelle 14.

As shown in FIG. 3, the air flow 30, such as in the form of intake air flow 30a, flows into the nacelle 14 at the air flow inlet 32 of the fixed portion 34 of the nacelle 14, such as in the form of an inlet cowl 34a. The intake air flow 30 (see FIG. 3) flows through the fan 36 (see FIG. 3) and the plurality of fan blades 37 (see FIG. 3) of the fan 36 to become fan air flow 30b (see FIG. 3). As shown in FIG. 3, the fan air flow 30b flows around the sides of an engine core 38 and around the thrust reverser bullnose fairing 40.

As further shown in FIG. 3, the fan air flow 30b flows through cascade members 62, such as in the form of cascade vanes 62a, and exits the nacelle 14, as reverse efflux air flow 30c, at the reverse efflux air flow discharge portion 43 of the engine 16. During thrust reversal, instead of being ejected from the rear of the engine 16 (see FIG. 3) to generate forward thrust, the fan air flow 30b (see FIG. 3) is blocked by the blocker doors 44 (see FIG. 3) inside the engine 16 (see FIG. 3).

Figure 4A:
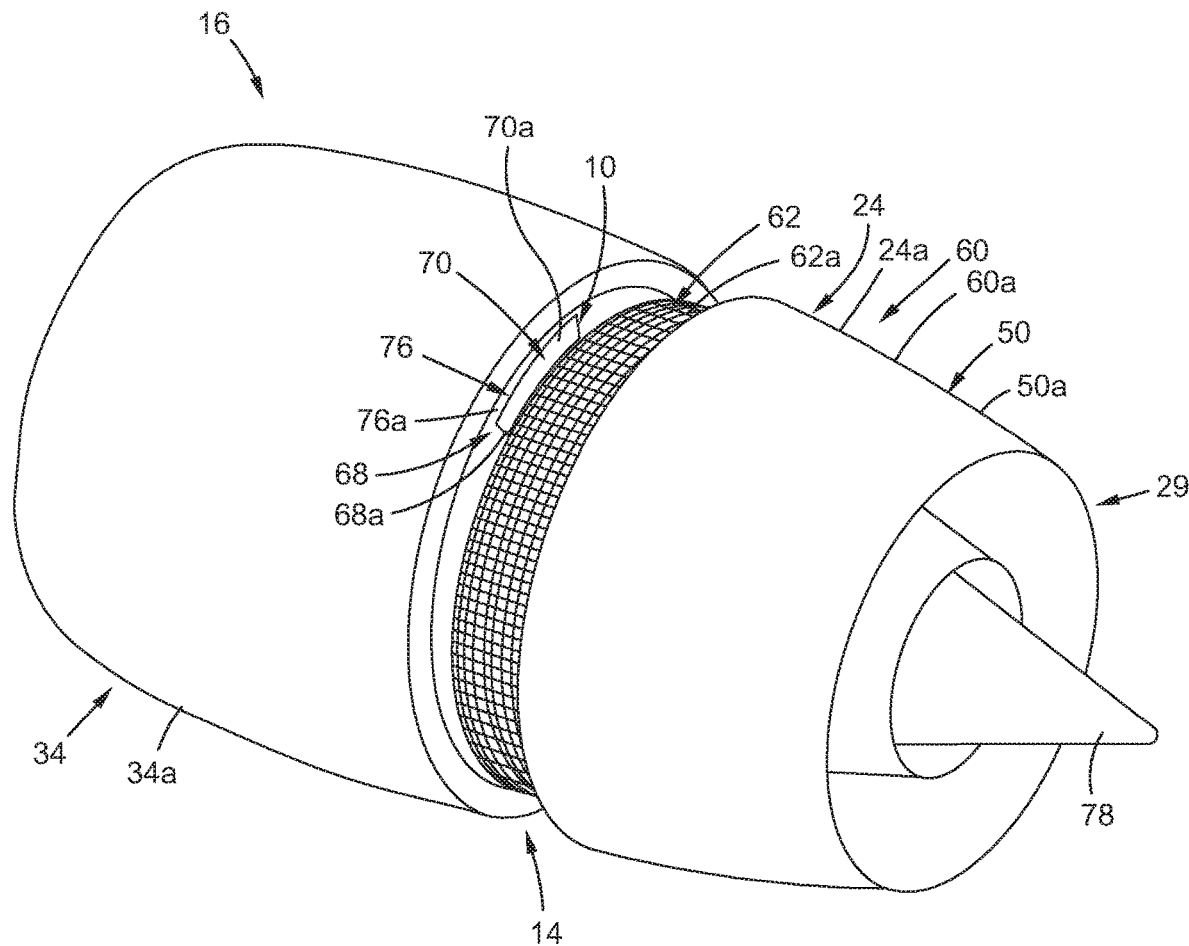
FIG. 4A is an illustration of a back side perspective view of an engine having a nacelle and a disclosed example of an air flow deflector assembly, where the air flow deflector apparatus is in a deployed position, such as a deployed thrust reversing position.
Figure 5A:
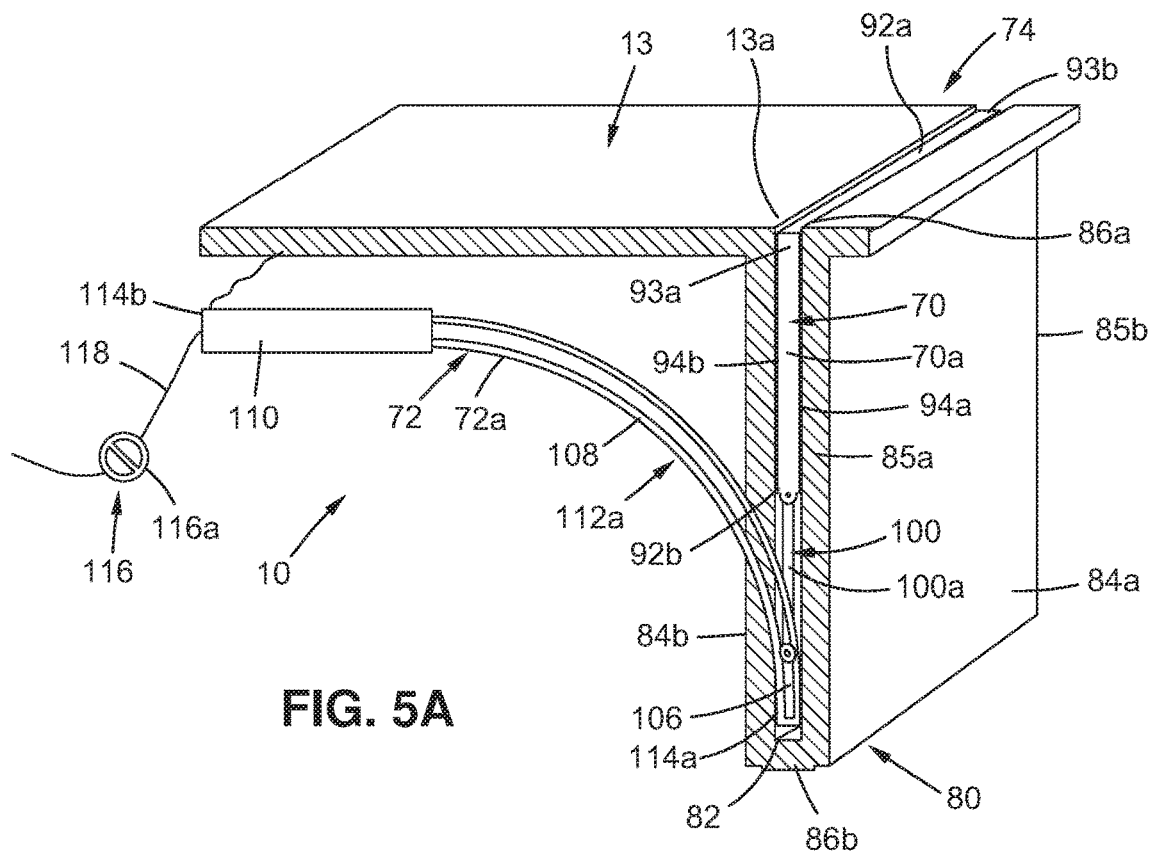
FIG. 5A is an illustration of a side perspective view of disclosed examples of an air flow deflector apparatus and an air flow deflector assembly including the air flow deflector apparatus, where the air flow deflector apparatus is in a stowed position.
Figure 5B:
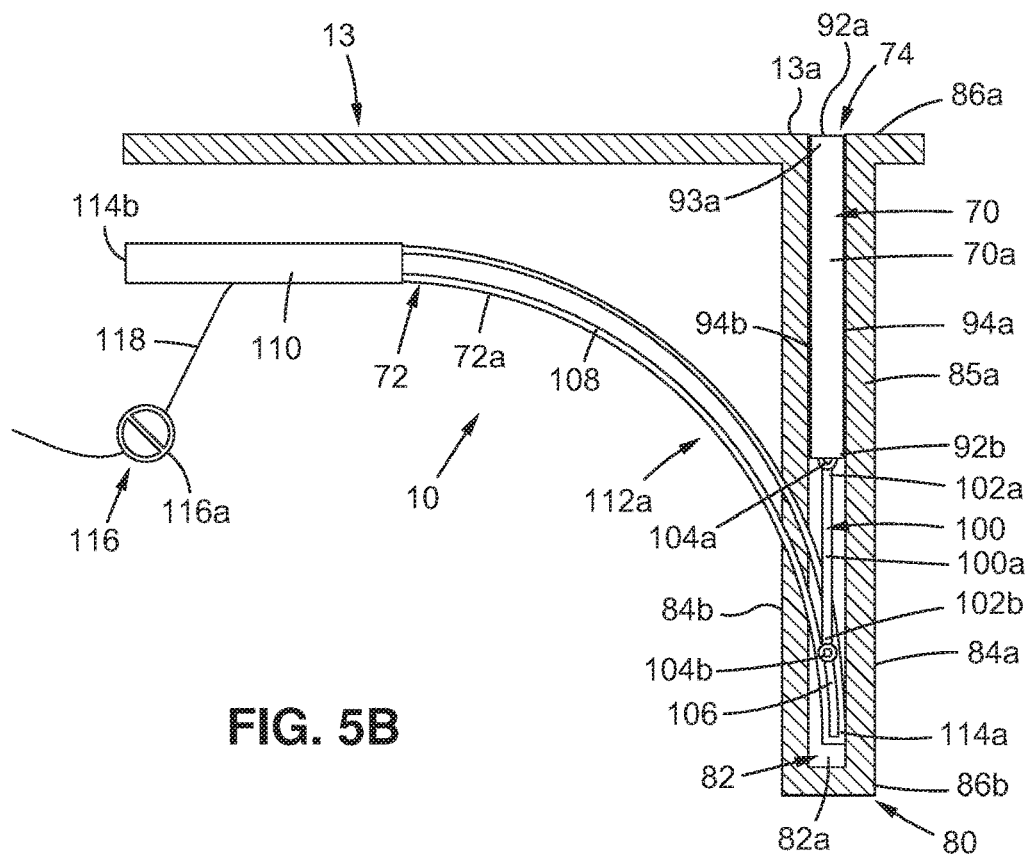
FIG. 5B is an illustration of a side view of the air flow deflector apparatus and the air flow deflector assembly of FIG. 5A, where the air flow deflector apparatus of FIG. 5A is in the stowed position.
Figure 6A:
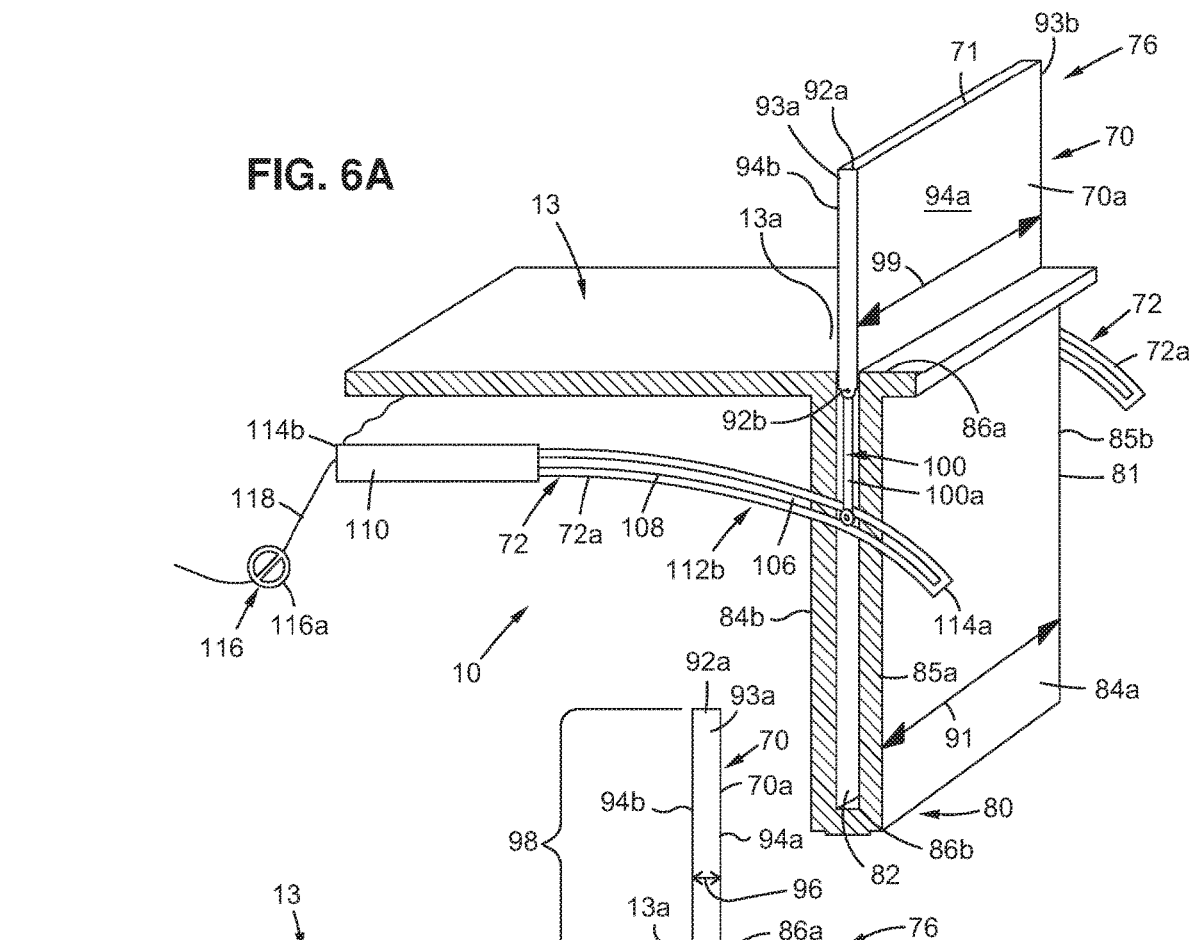
FIG. 6A is an illustration of a side perspective view of disclosed examples of an air flow deflector apparatus and an air flow deflector assembly including the air flow deflector apparatus, where the air flow deflector apparatus is in a deployed position.

As shown in FIG. 3, the air flow deflector assembly 10 comprises an air flow deflector apparatus 70, such as in the form of a deflector barrier panel 70a (see also FIGS. 5A-6B), having a substantially rectangular shape 71 (see FIG. 6A). The air flow deflector apparatus 70 is shown in FIG. 3 in a deployed position 76, such as a deployed thrust reversing position 76a. The air flow deflector apparatus 70 (see FIGS. 3, 5A, 6A) is movable between a stowed position 74 (see FIGS. 4C, 5A), such as a stowed non-reversing position 74a (see FIGS. 4C, 7), and the deployed position 76 (see FIGS. 3, 4A, 6A), such as the deployed thrust reversing position 76a (see FIGS. 3, 4A, 7), to deflect an air flow 30 (see FIG. 3), such as a reverse efflux air flow 30c (see FIG. 3) out of the engine 16 (see FIG. 3), and to provide an effective reverse thrust 126 (see FIG. 7) for the thrust reverser system 24 (see FIG. 3). As used herein, "effective reverse thrust" means an optimal reverse thrust, as a result of the air flow deflector apparatus, when deployed at a low landing speed (e.g., 50-60 knots) of the air vehicle, such as the aircraft, preventing or minimizing re-ingestion reverse efflux air flow at the air flow inlet of the engine, while allowing an improved thrust reverser performance and maximum reverse efflux air flow by the thrust reverser, such as the re-ingestion reducing thrust reverser, at a high landing speed (e.g., 115-120 knots).

Upon landing of the air vehicle 12, the air flow deflector apparatus 70 (see FIG. 3) of the air flow deflector assembly 10 (see FIG. 3) preferably deflects the air flow 30 (see FIG. 3), such as the reverse efflux air flow 30c (see FIG. 3), in an outward direction 66 (see FIG. 3) away from the engine 16 (see FIG. 3), rather than in a forward direction 46 (see FIG. 2) toward the air flow inlet 32 (see FIG. 2), as with the known cascade-type thrust reverser system 26 (see FIG. 2), to produce a deflected reverse efflux air flow 30f (see FIG. 3) that flows outwardly and is away from being re-ingested at the air flow inlet 32 (see FIG. 3) of the engine 16 (see FIG. 3).

The air flow deflector apparatus 70 (see FIGS. 3, 5A-6B) is preferably coupled to an extender member 100 (see FIGS. 3, 5A-6B). As shown in FIG. 3, the air flow deflector assembly 10 further comprises the extender member 100. The extender member 100 (see FIGS. 3, 5A-6B) is coupled to the air flow deflector apparatus 70 (see FIGS. 3, 5B, 6B).

Figure 4B:
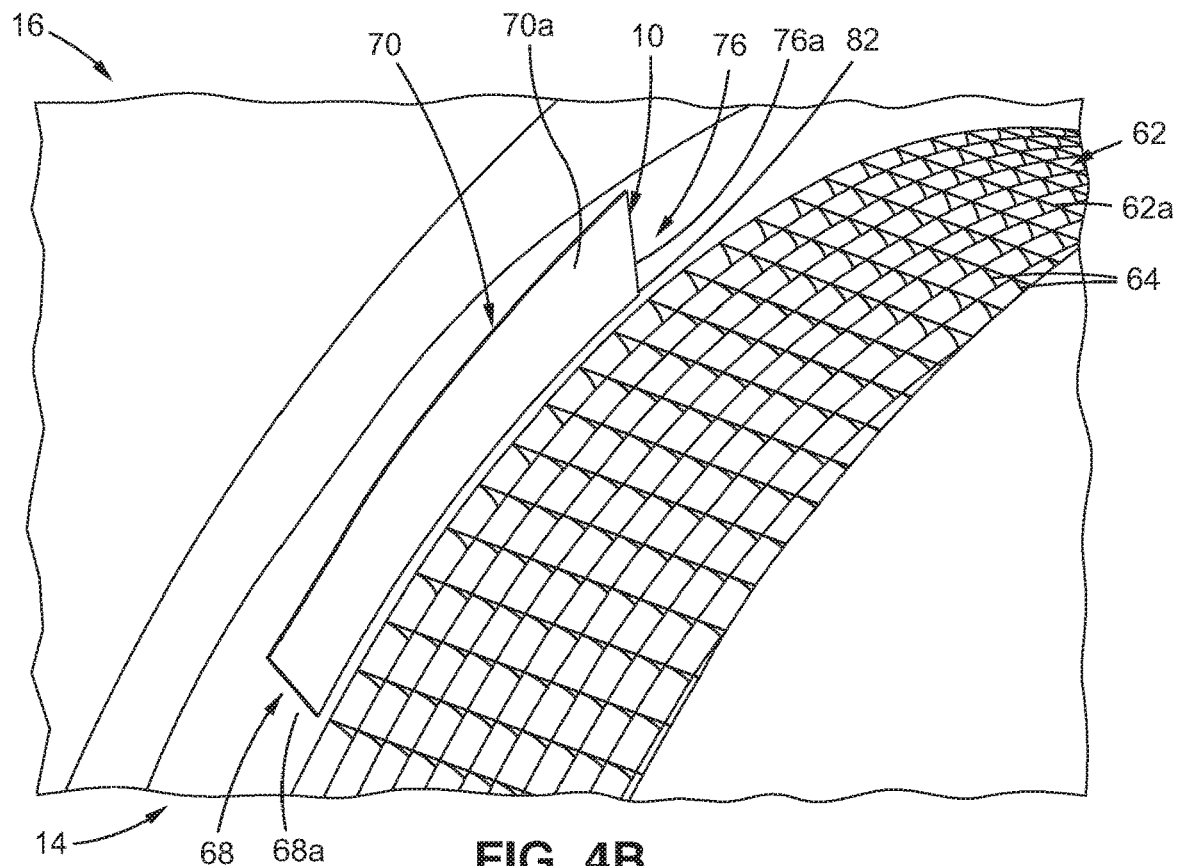
FIG. 4B is an illustration of a close-up view of the nacelle and the air flow deflector apparatus of FIG. 4A in the deployed position, such as the deployed thrust reversing position.
Figure 4C:
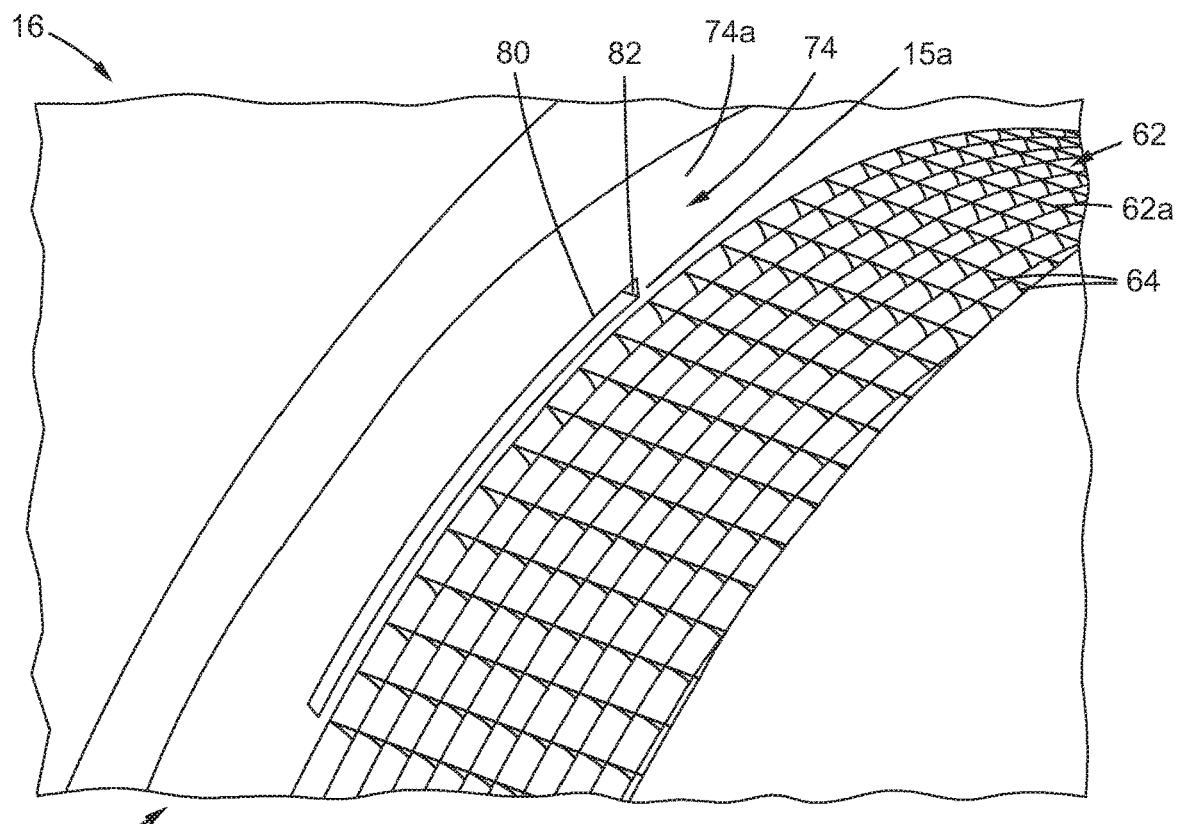
FIG. 4C is an illustration of a close-up view of the nacelle of FIG. 4B, where the air flow deflector apparatus is in a stowed position, such as a stowed non-reversing position.

The air flow deflector apparatus 70 (see FIGS. 3, 5A-6B) and the extender member 100 (see FIGS. 3, 5A-6B) are configured to be stowed in a recessed housing 80 (see FIGS. 3, 5A-6B) disposed in a surface 15a (see FIG. 3) of the nacelle 14 (see FIG. 3) of the engine 16 (see FIG. 3), when the air flow deflector apparatus 70 (see FIGS. 3, 5A-6B) is in the stowed non-reversing position 74a (see FIG. 4C). The air flow deflector assembly 10 (see FIG. 3) further comprises the recessed housing 80 (see FIG. 3) disposed in a surface 13a (see FIG. 3) of the structure 13 (see FIG. 3), such as a surface 15a (see FIG. 3) of the nacelle 14 (see FIG. 3), of the engine 16 (see FIG. 3). The recessed housing 80 (see FIG. 3), discussed in more detail below with respect to FIGS. 5A-6B, has an interior opening 82 (see FIGS. 5A-6B) configured to stow the air flow deflector apparatus 70 (see FIGS. 3, 5A-6B) and the extender member 100 (see FIGS. 3, 5A-6B) within the recessed housing 80 (see FIGS. 3, 5A-6B) in the stowed position 74 (see FIGS. 4C, 5A-5B, 7), such as the stowed non-reversing position 74a (see FIGS. 4C, 7).

An air flow deflector actuator 72 (see FIGS. 3, 5A-6B) is coupled to the extender member 100 (see FIGS. 3, 5A-6B) and is coupled to the recessed housing 80 (see FIGS. 3, 5A-6B). The air flow deflector actuator 72 (see FIGS. 3, 5A-6B) preferably moves the air flow deflector apparatus 70 (see FIGS. 3, 5A-6B) between the stowed non-reversing position 74a (see FIG. 4C) within the recessed housing 80 (see FIGS. 3, 5A-6B), and the deployed thrust reversing position 76a (see FIGS. 3, 4B) adjacent to a reverse efflux air flow exit portion 43 (see FIG. 3) of the engine 16 (see FIG. 3). The air flow deflector actuator 72 preferably comprises one of, a shape memory alloy (SMA) actuator 72a, an electrical actuator 72b, a pneumatic actuator 72c, a hydraulic actuator 72d, a mechanical actuator 72e, or another suitable actuator mechanism.

As shown in FIG. 3, the air flow deflector assembly 10 further comprises the air flow deflector actuator 72, such as in the form of a shape memory alloy (SMA) deflector actuator 72a. The air flow deflector actuator 72 (see FIG. 3) is configured to move the air flow deflector apparatus 70 (see FIG. 3) between the stowed position 74 (see FIGS. 4C, 5A-5B, 7), such as the stowed non-reversing position 74a (see FIGS. 4C, 7), within the recessed housing 80 (see FIGS. 5A-5B), and the deployed position 76 (see FIGS. 3, 4B, 6A-6B, 7), such as the deployed thrust reversing position 76a (see FIGS. 3, 4B, 7), adjacent to a reverse efflux air flow exit portion 43 (see FIG. 3) of the engine 16 (see FIG. 3). The air flow deflector actuator 72 is discussed in more detail below with respect to FIGS. 5A-6B and 7.

Figure 7:
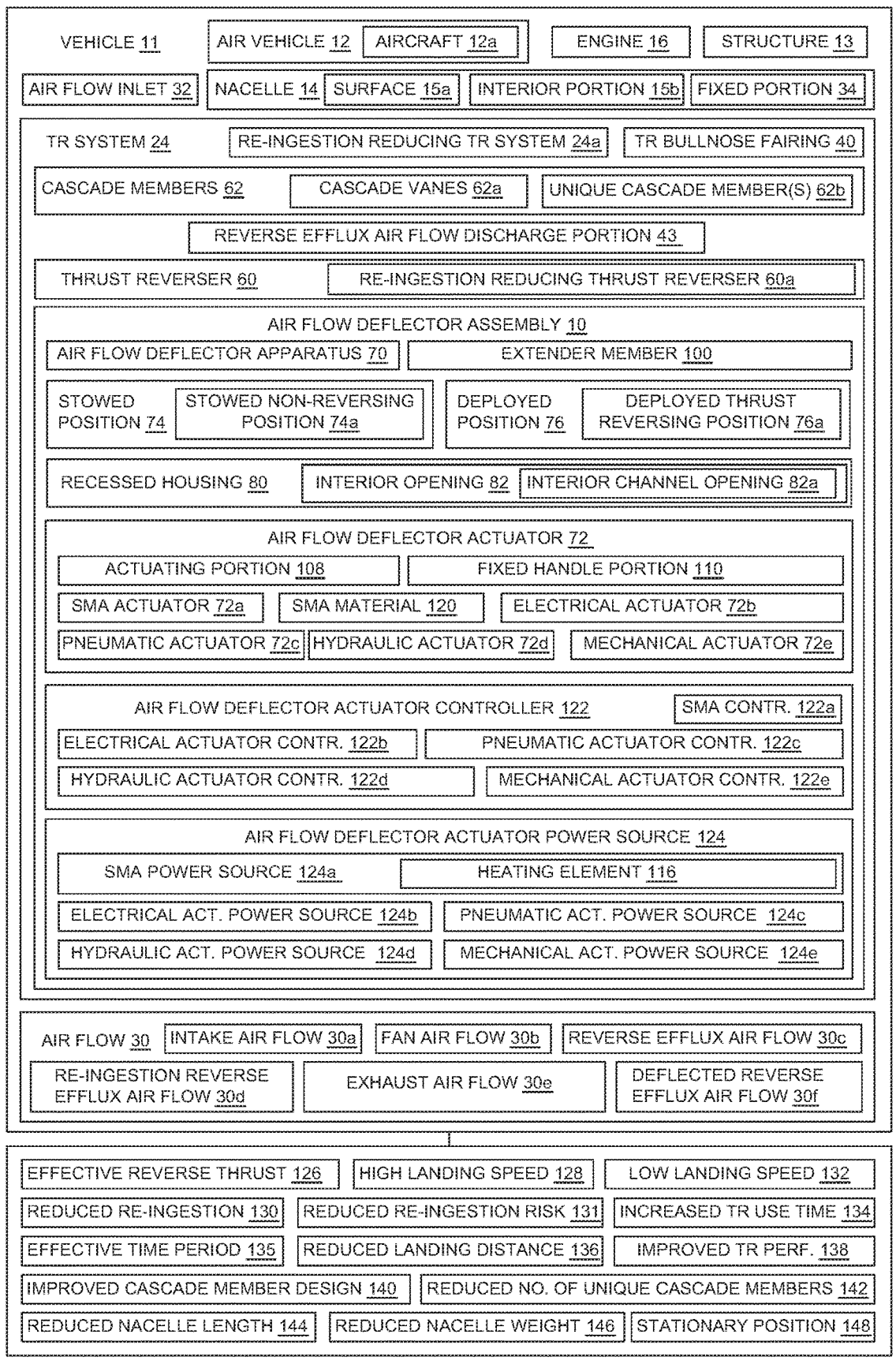
FIG. 7 is an illustration of a functional block diagram showing a disclosed example of a vehicle, such as an air vehicle, having disclosed examples of an air flow deflector apparatus and an air flow deflector assembly for a thrust reverser system.

The air flow deflector apparatus 70 (see FIGS. 3, 5A-5B), the extender member 100 (see FIGS. 3, 5A-5B), the recessed housing 80 (see FIGS. 5A-5B), and the air flow deflector actuator 72 (see FIGS. 3, 5A-5B) are assembled to form the air flow deflector assembly 10 (see FIGS. 3, 5A-5B) for the thrust reverser system 24 (see FIG. 3), such as the re-ingestion reducing thrust reverser system 24a (see FIG. 3), of the engine 16 (see FIG. 3) of the air vehicle 12 (see FIGS. 1, 7). Upon landing of the air vehicle 12 (see FIGS. 1, 7), the air flow deflector assembly 10 (see FIGS. 1, 3) is configured to deflect a reverse efflux air flow 30c (see FIGS. 3, 7) away from being re-ingested at the air flow inlet 32 (see FIGS. 3, 7) of the engine 16 (see FIGS. 1, 3, 7).

As shown in FIG. 3, the nacelle 14 includes the fixed portion 34, such as in the form of inlet cowl 34a, at the forward end 52 of the nacelle 14, and the nacelle 14 further includes the translating portion 50, such as in the form of the translating sleeve 50a, at the aft end 54 of the nacelle 14. As shown in FIG. 3, exhaust air flow 30e exits from the nozzle portion 56 of the engine 16 at the aft end 54 of the nacelle 14. FIG. 3 further shows thrust reverser actuators 58 for actuating the translating sleeve 50a in an aft direction 48. During thrust reverser activation, the thrust reverser 60 (see FIG. 3), such as in the form of re-ingestion reducing thrust reverser 60a (see FIG. 3), moves in the aft direction 48 (see FIG. 3) to expose the plurality of cascade members 62 (see FIG. 3), such as the cascade vanes 62a (see FIG. 3), and ends up in a deployed reverse thrust position 29 (see FIG. 3).

Now referring to FIG. 4A, FIG. 4A is an illustration of a back side perspective view of an engine 16 having a nacelle 14 and a disclosed example of an air flow deflector assembly 10, where the air flow deflector apparatus 70 is in the deployed position 76, such as the deployed thrust reversing position 76a. FIG. 4A shows the air flow deflector apparatus 70, such as in the form of a deflector barrier panel 70a, of the air flow deflector assembly 10, for the thrust reverser system 24, such as the re-ingestion reducing thrust reverser system 24a. As shown in FIG. 4A, the air flow deflector apparatus 70 is deployed at a location 68, such as a first location 68a, of the nacelle 14, that is forward of a plurality of cascade members 62, such as in the form of cascade vanes 62a. FIG. 4A further shows the thrust reverser 60, such as in the form of the re-ingestion reducing thrust reverser 60a, of the thrust reverser system 24, in the deployed reverse thrust position 29. In this example, the air flow deflector apparatus 70 (see FIG. 4A) has a curved shape that is preferably similar to the outer curved shape of the engine 16 (see FIG. 4A) or the outer curved shape of the nacelle 14 (see FIG. 4A). FIG. 4A further shows the fixed portion 34, such as in the form of the inlet cowl 34a, of the nacelle 14, and the translating portion 50, such as in the form of the translating sleeve 50a, of the nacelle 14. FIG. 4A further shows a plug portion 78 of the engine 16.

Now referring to FIG. 4B, FIG. 4B is an illustration of a close-up view of the nacelle 14 and the air flow deflector assembly 10 of the engine 16 of FIG. 4A, where the air flow deflector apparatus 70 is in the deployed position 76, such as the deployed thrust reversing position 76a. FIG. 4B shows the air flow deflector apparatus 70, such as in the form of the deflector barrier panel 70a, of the air flow deflector assembly 10, deployed out of an interior opening 82, at the location 68, such as the first location 68a, of the nacelle 14, that is forward of the plurality of cascade members 62, such as in the form of cascade vanes 62a. As shown in FIG. 4B, the plurality of cascade members 62, such as in the form of cascade vanes 62*a*, have turning angles 64.

Now referring to FIG. 4C, FIG. 4C is an illustration of a close-up view of the nacelle 14 of the engine 16 of FIG. 4B, where the air flow deflector apparatus 70 of FIG. 4B is now in the stowed position 74, such as the stowed non-reversing position 74*a*. FIG. 4C shows the interior opening 82 of the recessed housing 80, where the recessed housing 80 is disposed in a surface 15*a* of the nacelle 14, and where the air flow deflector apparatus 70 (see FIG. 4B) is stowed out of sight. FIG. 4C further shows the plurality of cascade members 62, such as in the form of cascade vanes 62*a*, and their turning angles 64.

Figure 6B:
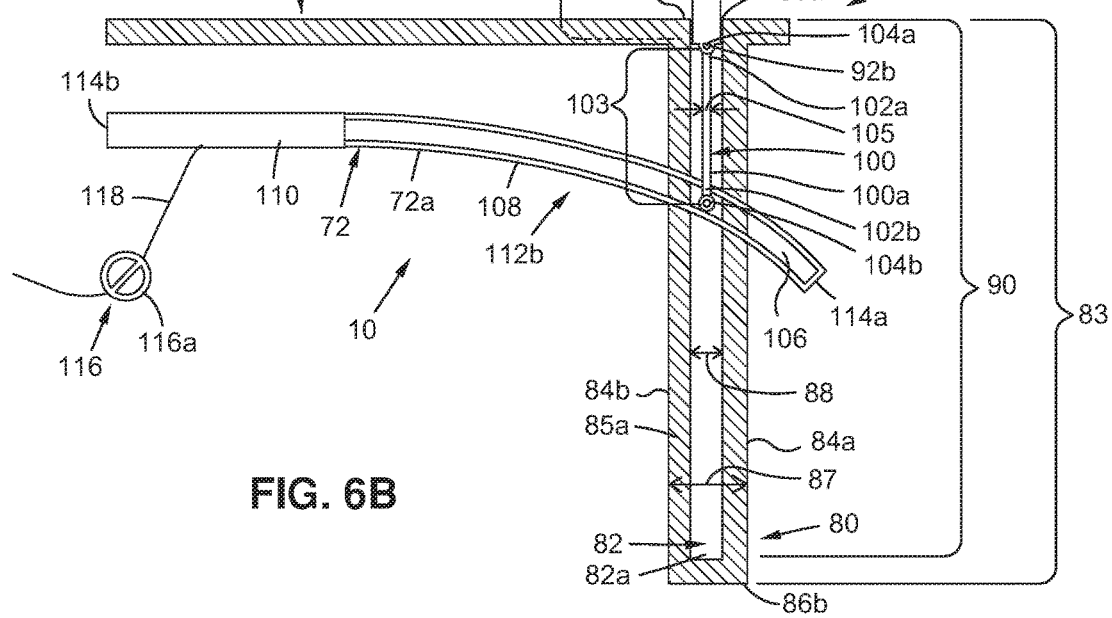
FIG. 6B is an illustration of a side view of the air flow deflector apparatus and the air flow deflector assembly of FIG. 6A, where the air flow deflector apparatus of FIG. 6A is in the deployed position.

Now referring to FIGS. 5A, 5B, 6A, and 6B, FIG. 5A is an illustration of a side perspective view of disclosed examples of an air flow deflector apparatus 70 and an air flow deflector assembly 10 including the air flow deflector apparatus 70, where the air flow deflector apparatus 70 is in the stowed position 74, and FIG. 5B is an illustration of a side view of the air flow deflector apparatus 70 and the air flow deflector assembly 10 of FIG. 5A, where the air flow deflector apparatus 70 of FIG. 5A is in the stowed position 74. FIG. 6A is an illustration of a side perspective view of disclosed examples of the air flow deflector apparatus 70 and the air flow deflector assembly 10 including the air flow deflector apparatus 70, where the air flow deflector apparatus 70 is in the deployed position 76, and FIG. 6B is an illustration of a side view of the air flow deflector apparatus 70 and the air flow deflector assembly 10 of FIG. 6A, where the air flow deflector apparatus 70 of FIG. 6A is in the deployed position 76.

As shown in FIGS. 5A-6B, the air flow deflector assembly 10 comprises the air flow deflector apparatus 70, such as in the form of a deflector barrier panel 70*a*, preferably having a substantially rectangular shape 71 (see FIG. 6A). However, the air flow deflector apparatus 70 (see FIGS. 5A-6B) may also have another suitable shape or configuration, for example, a curved shape, such as shown in FIG. 4A, that is preferably similar to the outer curved shape of the engine 16 (see FIG. 4A) or the outer curved shape of the nacelle 14 (see FIG. 4A). Preferably, the air flow deflector apparatus 70 (see FIGS. 5A-6B), such as in the form of a deflector barrier panel 70*a* (see FIGS. 5A-6B), is solid in structure, so that no air flow 30 (see FIG. 3), such as reverse efflux air flow 30*c* (see FIG. 3), can penetrate or flow through the air flow deflector apparatus 70 (see FIG. 6A), when in the deployed position 76 (see FIG. 6A).

As shown in FIGS. 5A-6B, the air flow deflector apparatus 70 comprises an outer end 92*a*, an inner end 92*b*, a first side end 93*a*, a second side end 93*b* (see FIGS. 5A, 6A), an aft side 94*a*, and a forward side 94*b*. The air flow deflector apparatus 70 (see FIG. 6B) has a thickness 96 (see FIG. 6B). In one example, the air flow deflector apparatus 70 (see FIG. 6B) may have a thickness 96 (see FIG. 6B) in a range of about one-eighth (⅛) inch to about one (1) inch in size, such as for a smaller aircraft. However, the air flow deflector apparatus 70 (see FIG. 6B) may have another suitable thickness 96 (see FIG. 6B) size, such as a larger thickness for a larger aircraft. The thickness 96 (see FIG. 6B) of the air flow deflector apparatus 70 (see FIG. 6B) chosen may depend on one or more of, the size of the structure 13 (see FIGS. 5B, 6B), such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on a thickness 88 (see FIG. 6B) of the interior opening 82 (see FIG. 6B) and desired size of the recessed housing 80 (see FIG. 6B) chosen.

The air flow deflector apparatus 70 (see FIG. 6B) further has a length 98 (see FIG. 6B) (or height). In one example, the air flow deflector apparatus 70 (see FIG. 6B) may have a length 98 (see FIG. 6B) (or height) in a range of from about 0.1 inch, for a small model or test aircraft engine, to about 24 (twenty-four) inches for a large aircraft engine, and in another example, may have a length 98 (see FIG. 6B) in a range of from about one (1) inch to about six (6) inches long. However, the air flow deflector apparatus 70 (see FIG. 6B) may have another suitable length 98 (see FIG. 6B) (or height). The length 98 (see FIG. 6B) of the air flow deflector apparatus 70 (see FIG. 6A) chosen may depend on one or more of, the size of the structure 13, such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on a length 90 (see FIG. 6B) of the interior opening 82 (see FIG. 6B) and desired size of the recessed housing 80 (see FIG. 6B) chosen.

The air flow deflector apparatus 70 (see FIG. 6A) further has a width 99 (see FIG. 6A). The width 99 (see FIG. 6A) of the air flow deflector apparatus 70 (see FIG. 6A) chosen may depend on one or more of, the size of the structure 13, such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on a width 91 (see FIG. 6A) and desired size of the recessed housing 80 (see FIG. 6A) chosen. Preferably, the air flow deflector apparatus 70 (see FIG. 6A) has a width 99 (see FIG. 6A) that is sufficient to fit closely or snugly within the interior opening 82 (see FIG. 6A) of the recessed housing 80 (see FIG. 6A). If the air flow deflector apparatus 70 (see FIG. 4A) is curved or slightly curved, the width 99 (see FIG. 6A) of the air flow deflector apparatus 70 (see FIG. 6A) may be in a range of a curved line of about 10 degrees to a curved line of about 90 degrees. However, the air flow deflector apparatus 70 (see FIG. 6A) may have another suitable width 99 (see FIG. 6A).

As shown in FIGS. 5A-5B, the air flow deflector assembly 10 further comprises one or more extender members 100, such as each in the form of an extender rod 100*a*. Preferably, the air flow deflector assembly 10 has two (2) extender members 100, where one extender member 100 is coupled or attached to the first side end 93*a* (see FIGS. 5A-6B) and another extender member 100 is coupled or attached to the second side end 93*b* (see FIGS. 5A, 6A). Each extender member 100 (see FIGS. 5B, 6B), such as in the form of extender rod 100*a* (see FIGS. 5B, 6B), has a first end 102*a* (see FIGS. 5B, 6B) and a second end 102*b* (see FIGS. 5B, 6B). As shown in FIGS. 5B, 6B, the first end 102*a* includes a first connector element 104*a*, such as a pin or other suitable connector element, that is coupled to the inner end 92*b* (see FIGS. 5B, 6B) of the air flow deflector apparatus 70. As further shown in FIGS. 5B, 6B, the second end 102*b* includes a second connector element 104*b*, such as a pin or other suitable connector element, that is coupled to an interior portion 106 of the air flow deflector actuator 72.

The extender member 100 (see FIG. 6B) has a length 103 (see FIG. 6B) (or height). The length 103 (see FIG. 6B) of the extender member 100 (see FIG. 6B) chosen may depend on one or more of, the size of the structure 13, such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the extender member 100 (see FIG. 6B), and also depends on a length 90 (see FIG. 6B) of the interior opening 82 (see FIG. 6B) and desired size of the recessed housing 80 (see FIG. 6B) chosen. In one example, the extender member 100 (see FIG. 6B) may have a length 103 (see FIG. 6B) (or height) in a range of from about 0.1 inch, for a small model or test aircraft engine, to about 24 (twenty-four) inches for a large aircraft engine, and in another example, may have a length 98 (see FIG. 6B) in a range of about one (1) inch to about six (6) inches long. However, the extender member 100 (see FIG. 6B) may have another suitable length 103 (see FIG. 6B) (or height).

The extender member 100 (see FIG. 6B) has a thickness 105 (see FIG. 6B). Preferably, the extender member 100 (see FIG. 6B) has a thickness 105 (see FIG. 6B) that is less than the thickness 96 (see FIG. 6B) of the air flow deflector apparatus 70 (see FIG. 6B). Alternatively, the thickness 105 (see FIG. 6B) of the extender member 100 (see FIG. 6B) may be the same or substantially the same thickness as the thickness 96 (see FIG. 6B) of the air flow deflector apparatus 70 (see FIG. 6B). In one example, the thickness 105 (see FIG. 6B) of the extender member 100 (see FIG. 6B) may be in a range of about one-eighth (⅛) inch to about one (1) inch in size for a smaller aircraft. However, the extender member 100 (see FIG. 6B) may have another suitable thickness 105 (see FIG. 6B) size, such as a larger thickness. The thickness 105 (see FIG. 6B) of the extender member 100 (see FIG. 6B) chosen may depend on one or more of, the size of the structure 13 (see FIGS. 5A, 6A), such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on a thickness 88 (see FIG. 6B) of the interior opening 82 (see FIG. 6B) and desired size of the recessed housing 80 (see FIG. 6B) chosen.

As shown in FIGS. 5A-5B, the air flow deflector assembly 10 further comprises the recessed housing 80 disposed in a surface 13a of the structure 13, for example, a nacelle 14 (see FIGS. 4A, 7). The recessed housing 80 (see FIGS. 5A-6B) preferably has a shape or configuration similar to the shape or configuration of the air flow deflector apparatus 70 (see FIGS. 5A-6B), such as in the form of a deflector barrier panel 70a (see FIGS. 5A-6B). For example, the recessed housing 80 (see FIG. 6A) may have a substantially rectangular shape 81 (see FIG. 6A) similar to the substantially rectangular shape 71 (see FIG. 6A) of the air flow deflector apparatus 70 (see FIG. 6A). In addition, the air flow deflector apparatus 70 with the curved configuration, as shown in FIG. 4A, may be stored in the recessed housing 80 with the substantially rectangular shape 81, shown in FIG. 6A.

As further shown in FIGS. 5A-6B, the recessed housing 80 has an interior opening 82, such as in the form of an interior channel opening 82a (see FIGS. 5B, 6B), for example, a longitudinal U-shaped interior channel opening. The interior opening 82 (see FIG. 5B) is preferably configured to stow both the air flow deflector apparatus 70 (see FIG. 5B) and the extender member 100 (see FIG. 5B) within the recessed housing 80 (see FIG. 5B) in the stowed position 74 (see FIG. 5B).

As shown in FIGS. 5A-6B, the recessed housing 80 has an aft side 84a, a forward side 84b, a first side end 85a, a second side end 85b, an outer end 86a, and an inner end 86b. As shown in FIG. 6B, the recessed housing 80 has a thickness 87, and the interior opening 82 has a thickness 88. The thickness 87 (see FIG. 6B) of the recessed housing 80 (see FIG. 6B) is greater than the thickness 88 (see FIG. 6B) of the interior opening 82 (see FIG. 6B). As shown in FIG. 6B, both the thickness 87 of the recessed housing 80 and the thickness 88 of the interior opening 82 are each greater than the thickness 96 of the air flow deflector apparatus 70, and are each greater than the thickness 105 of the extender member 100. In one example, the recessed housing 80 (see FIG. 6B) may have a thickness 87 (see FIG. 6B) in a range of greater than about one-eighth (⅛) inch to greater than about one (1) inch in size, and in another example, may have a thickness 87 (see FIG. 6B) in a range of about one-half (½) inch to about two (2) inches in size, such as for a smaller aircraft. However, the recessed housing 80 (see FIG. 6B) may have another suitable thickness 87 (see FIG. 6B) size, such as a larger thickness for a larger aircraft. In one example, the interior opening 82 (see FIG. 6B) may have a thickness 88 (see FIG. 6B) in a range of greater than about one-eighth (⅛) inch to greater than about one (1) inch in size, and in another example, the interior opening 82 (see FIG. 6B) may have a thickness 88 (see FIG. 6B) in a range of about one-quarter (¼) inch to about one and a half (1.5) inches in size, such as for a smaller aircraft. However, the interior opening 82 (see FIG. 6B) may have another suitable thickness 88 (see FIG. 6B) size, such as a larger thickness for a larger aircraft. The thickness 87 (see FIG. 6B) of the recessed housing 80 (see FIG. 6B) and the thickness 88 (see FIG. 6B) of the interior opening 82 (see FIG. 6B) chosen may depend on one or more of, the size of the structure 13 (see FIGS. 5B, 6B), such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on the thickness 96 (see FIG. 6B) of the air flow deflector apparatus 70 (see FIG. 6B) and the thickness 105 (see FIG. 6B) of the extender member 100 (see FIG. 6B) chosen.

As shown in FIG. 6B, the recessed housing 80 has a length 83 (or height), and the interior opening 82, such as in the form of the interior channel opening 82a, has a length 90 (or height), and the length 83 of the recessed housing 80 is greater than the length of the interior opening 82. Preferably, the length 83 (see FIG. 6B) of the recessed housing 80 (see FIG. 6B) and the length of the interior opening 82 (see FIG. 6B) are each greater than the length 98 (see FIG. 6B) of the air flow deflector apparatus 70 (see FIG. 6B), are each greater than the length 103 (see FIG. 6B) of the extender member 100 (see FIG. 6B), and are each greater than the combination of the length 98 (see FIG. 6B) of the air flow deflector apparatus 70 (see FIG. 6B) and the length 103 (see FIG. 6B) of the extender member 100 (see FIG. 6B). In one example, the recessed housing 80 (see FIG. 6B) may have a length 83 (see FIG. 6B) in a range of greater than 0.1 inch, for a small model or test aircraft engine, to greater than 24 (twenty-four) inches for a large aircraft engine, and in another example, may have a length 83 (see FIG. 6B) in a range of from about two (2) inches to about twelve (12) inches in size. However, the recessed housing 80 (see FIG. 6B) may have another suitable length 83 (see FIG. 6B) (or height). In one example, the interior opening 82 (see FIG. 6B) may have a length 83 (see FIG. 6B) in a range of greater than 0.1 inch, for a small model or test aircraft engine, to greater than 24 (twenty-four) inches for a large aircraft engine, and in another example, may have a length 90 (see FIG. 6B) in a range of about one (1) inch to about eleven (11) inches in size. However, the interior opening 82 (see FIG. 6B) may have another suitable length 90 (see FIG. 6B) (or height). The length 83 (see FIG. 6B) of the recessed housing 80 (see FIG. 6B) and the length 90 (see FIG. 6B) of the interior opening 82 (see FIG. 6B) chosen may depend on one or more of, the size of the structure 13, such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6B) with the air flow deflector apparatus 70 (see FIG. 6B), and also depends on the desired length 98 (see FIG. 6B) of the air flow deflector apparatus 70 and the desired length 103 (see FIG. 6B) of the extender member 100 (see FIG. 6B) chosen.

As shown in FIG. 6A, the recessed housing 80 has a width 91. The width 91 (see FIG. 6A) of the recessed housing 80 (see FIG. 6A) is preferably about the same width or slightly wider than a width of the interior opening 82 (see FIG. 6A). The width 91 (see FIG. 6A) of the recessed housing 80 (see FIG. 6A) chosen may depend on one or more of, the size of the structure 13 (see FIG. 6A), such as the nacelle 14 (see FIGS. 1, 3, 4A), the size of the engine 16 (see FIGS. 1, 3, 4A), the size of the engine diameter, the size of the engine fan diameter, and the size of the air vehicle 12 (see FIG. 1) incorporating the air flow deflector assembly 10 (see FIG. 6A) with the air flow deflector apparatus 70 (see FIG. 6A), and also depends on the desired width 99 (see FIG. 6A) and size of the air flow deflector apparatus 70 (see FIG. 6A) chosen. Preferably, the recessed housing 80 (see FIG. 6A) has a width 91 (see FIG. 6A) that is sufficient to accommodate the width 99 (see FIG. 6A) of the air flow deflector apparatus 70 (see FIG. 6A), and to accommodate a width of the extender member 100 (see FIG. 6A).

As shown in FIGS. 5A-6B, the air flow deflector assembly 10 further comprises an air flow deflector actuator 72, such as in the form of a shape memory alloy (SMA) deflector actuator 72a, comprising an actuating portion 108 with an interior portion 106, and a fixed handle portion 110. As shown in FIGS. 5A-6B, the air flow deflector actuators 72, such as in the form of SMA deflector actuators 72a, may be coupled or attached to a heating element 116, such as in the form of a resistor element 116a, for example, a battery or other suitable resistor element, via an attachment element 118, such as a wire, that can attach to one or both air flow deflector actuators 72. The air flow deflector actuators 72 (see FIGS. 5A-6B), such as in the form of SMA deflector actuators 72a (see FIGS. 5A-6B), are preferably comprised of a shape memory alloy (SMA) material 120 (see FIG. 7), that may be heated or powered for actuation with the heating element 116 (see FIGS. 5A-6B), such as in the form of the resistor element 116a (see FIGS. 5A-6B). Alternatively, the air flow deflector actuator 72 (see FIGS. 5A-6B) may comprise an electrical actuator 72b (see FIG. 7), a pneumatic actuator 72c (see FIG. 7), a hydraulic actuator 72d (see FIG. 7), a mechanical actuator 72e (see FIG. 7), or another suitable actuator.

As shown in FIGS. 5A-5B, each air flow deflector actuator 72 is in a stowed position 112a, and as shown in FIGS. 6A-6B, each air flow deflector actuator 72 is in a deployed position 112b. As further shown in FIGS. 5A-6B, the air flow deflector actuator 72 has a first end 114a and a second end 114b. As further shown in FIGS. 5A-6B, each air flow deflector actuator 72 is coupled to the second end 102b of each respective extender member 100, and in particular, the interior portion 106 of the actuating portion 108 near the first end 114a of each air flow deflector actuator 72 is coupled to the second connector element 104b of the second end 102b of each respective extender member 100.

As further shown in FIGS. 5A-6B, each air flow deflector actuator 72 is also coupled to the recessed housing, and in particular, the interior portion 106 of the actuating portion 108 near the first end 114a of each air flow deflector actuator 72 is coupled, respectively, to the first side end 85a (see FIG. 6A) of the recessed housing 80, and to the second side end 85b (see FIG. 6A) of the recessed housing 80.

The fixed handle portion 110 (see FIGS. 5A-6B) of the air flow deflector actuator 72 (see FIGS. 5A-6B) is preferably coupled to an interior portion 13b (see FIG. 3) of the structure 13 (see FIGS. 3, 5A-6B), such as an interior portion 15b (see FIG. 3) of the nacelle 14 (see FIGS. 3, 4A-4C). Both the fixed handle portion 110 (see FIGS. 5A-6B) and the actuating portion 108 (see FIGS. 5A-6B) may be made of the shape memory alloy (SMA) material 120 (see FIG. 7), that may be heated or powered for actuation with the heating element 116 (see FIGS. 5A-6B), such as in the form of the resistor element 116a (see FIGS. 5A-6B).

The air flow deflector actuator 72 (see FIGS. 5A-6B) is configured to move the air flow deflector apparatus 70 (see FIGS. 5A-6B) between the stowed position 74 (see FIGS. 5A-5B) within the recessed housing 80 (see FIGS. 5A-5B), and the deployed position 76 (see FIGS. 6A-6B), adjacent to the reverse efflux air flow exit portion 43 (see FIG. 3) of the engine 16 (see FIG. 3).

Now referring to FIG. 7, in another disclosed example, a vehicle 11, such as in the form an air vehicle 12, for example, an aircraft 12a, having an air flow deflector apparatus 70 and an air flow deflector assembly 10 including the air flow deflector apparatus 70, for reducing re-ingestion of reverse efflux air flow 30c, is provided. FIG. 7 is an illustration of a functional block diagram showing a disclosed example of the vehicle 11, such as the air vehicle 12, for example, the aircraft 12a, having disclosed examples of an air flow deflector assembly 10 for a thrust reverser system 24, such as a re-ingestion reducing thrust reverser system. Preferably, the engine 16 (see FIGS. 1, 7) of the air vehicle 12 (see FIG. 1, 7), such as the aircraft 12a, comprises two air flow deflector assemblies 10 (see FIGS. 1, 7) positioned in a circumferentially spaced apart relationship 69 (see FIGS. 1, 3) relative to each other. Each air flow deflector assembly 10 (see FIG. 7) is preferably positioned at a location 68 (see FIG. 3) of the nacelle 14 (see FIGS. 3, 7) that is forward of a plurality of cascade members 62 (see FIGS. 3, 7) of the engine 16 (see FIGS. 3, 7), and that is downstream of a thrust reverser bullnose fairing 40 (see FIGS. 3, 7).

The air vehicle 12 (see FIG. 7), such as the aircraft 12a (see FIG. 7), comprises a fuselage 20 (see FIG. 1), at least one wing 18 (see FIG. 1) connected to the fuselage 20 (see FIG. 10), and at least one engine 16 (see FIGS. 1, 7) coupled to the at least one wing 18 (see FIG. 1). As shown in FIG. 7, the vehicle 11 comprises a structure 13 that the air flow deflector assembly 10 is coupled to. The structure 13 (see FIG. 7) may comprise a nacelle 14 (see FIG. 7), or another suitable structure, for the air flow deflector assembly 10. As shown in FIG. 7, the at least one engine 16 has a nacelle 14 with a surface 15a, an interior portion 15b, and the nacelle 14 comprises a fixed portion 34, such as an inlet cowl 34a (see FIG. 3), and a translating portion 50 (see FIG. 3), such as a translating sleeve 50a (see FIG. 3).

As shown in FIG. 7, the engine 16 of the air vehicle 12, such as in the form of aircraft 12a, has a thrust reverser system 24, such as a re-ingestion reducing thrust reverser system 24a. As further shown in FIG. 7, the thrust reverser system 24 comprises a thrust reverser 60, such as in the form of a re-ingestion reducing thrust reverser 60a, a thrust reverser bullnose fairing 40, and a plurality of cascade members 62, such as in the form of cascade vanes 62a. With the installation of the air flow deflector assembly 10 (see FIG. 7) in the air vehicle 12 (see FIG. 7), such as the aircraft 12a, an improved cascade member design 140 (see FIG. 7) preferably results, and a reduced number 142 (see FIG. 7) of unique cascade members 62b (see FIG. 7) preferably results. There are typically about 16 (sixteen) cascade members 62 per engine 16, and each cascade member 62 typically has a different turning angle 64 (see FIG. 4B). The total number of unique cascade members 62b (see FIG. 7) is typically about 8 (eight) of the 16 (sixteen) cascade members 62. Preferably, the air flow deflector assembly 10 (see FIG. 7) reduces the number of unique cascade members 62b (see FIG. 7) needed by the engine 16 (see FIG. 7) by one (1) or two (2) unique cascade members 62b (see FIG. 7). Because the number of unique cascade members 62b (see FIG. 7) is reduced, this may result in a decrease in the length and weight of the engine 16 (see FIG. 7), and, in turn, may result in a reduced nacelle length 144 (see FIG. 7) and a reduced nacelle weight 146 (see FIG. 7) of the nacelle 14 (see FIG. 7).

As shown in FIG. 7, the air flow deflector assembly 10 for the thrust reverser system 24, comprises an air flow deflector apparatus 70, movable between a stowed position 74, such as a stowed non-reversing position 74a, and a deployed position 76, such as a deployed thrust reversing position 76a. The air flow deflector assembly 10 (see FIG. 7) further comprises an extender member 100 (see FIG. 7) having a first end 102a (see FIGS. 5A-6B) coupled to the air flow deflector apparatus 70 (see FIG. 7).

As shown in FIG. 7, the air flow deflector assembly 10 further comprises a recessed housing 80 disposed in the surface 13a (see FIG. 5A) of the structure 13 (see also FIG. 5A), such as the surface 15a of the nacelle 14, where the recessed housing 80 has an interior opening 82, such as in the form of an interior channel opening 82a, configured to stow the air flow deflector apparatus 70 and the extender member 100 within the recessed housing 80 in the stowed position 74, such as the stowed non-reversing position 74a.

As shown in FIG. 7, the air flow deflector assembly 10 further comprises an air flow deflector actuator 72 comprising an actuating portion 108 coupled to a second end 102b (see FIG. 5B) of the extender member 100, and also coupled to the recessed housing 80. The air flow deflector actuator 72 (see FIG. 7) further comprises a fixed handle portion 110 (see FIG. 7) coupled to the interior portion 13b (see FIG. 3) of the structure 13 (see FIGS. 3, 5A-6B), such as the interior portion 15b (see FIGS. 3, 7) of the nacelle 14 (see FIGS. 3, 7). The air flow deflector actuator 72 (see FIG. 7) is configured to move the air flow deflector apparatus 70 (see FIG. 7) between the stowed position 74 (see FIG. 7), such as the stowed non-reversing position 74a (see FIG. 7) within the recessed housing 80 (see FIG. 7), and the deployed position 76 (see FIG. 7), such as the deployed thrust reversing position 76a (see FIG. 7), adjacent to a reverse efflux air flow exit portion 43 (see FIGS. 3, 7) of the engine 16 (see FIG. 7).

As shown in FIG. 7, the air flow deflector actuator 72 may comprise one of, a shape memory alloy (SMA) actuator 72a, an electrical actuator 72b, a pneumatic actuator 72c, a hydraulic actuator 72d, a mechanical actuator 72e, or another suitable actuator. The air flow deflector actuator 72 (see FIG. 7) preferably comprises the SMA actuator 72a (see FIG. 7) made of a shape memory alloy (SMA) material 120 (see FIG. 7) that is coupled to a shape memory alloy (SMA) power source 124a (see FIG. 7), such as a heating element 116 (see FIG. 7), for example, a resistor element 116a (see FIGS. 5A-6B), like a battery or other suitable resistor element.

The air flow deflector actuator 72 (see FIG. 7) may be controlled by an air flow deflector actuator controller 122 (see FIG. 7). As shown in FIG. 7, the air flow deflector actuator controller 122 may comprise one of, a shape memory alloy (SMA) controller 122a, an electrical actuator controller 122b, a pneumatic actuator controller 122c, a hydraulic actuator controller 122d, a mechanical actuator controller 122e, or another suitable actuator controller.

The air flow deflector actuator 72 may be powered by an air flow deflector actuator power source 124 (see FIG. 7). As shown in FIG. 7, the air flow deflector actuator power source 124 may comprise one of, a shape memory alloy (SMA) power source 124a such as a the heating element 116; an electrical actuator power source 124b such as a motor; a pneumatic actuator power source 124c such as an air pressure supply or high pressure air supply; a hydraulic actuator power source 124d such as hydraulic power, a high pressure pipeline gas supply, or a hydraulic fluid pressure supply; a mechanical actuator power source 124e such as rack and pinion; or another suitable actuator power source.

When the air flow deflector apparatus 70 (see FIG. 7) is in the deployed position 76 (see FIG. 7), such as the deployed thrust reversing position 76a (see FIG. 7), upon or after landing or touchdown of the air vehicle 12 (see FIG. 7), such as the aircraft 12a (see FIG. 7), the air flow deflector apparatus 70 (see FIG. 7) deflects reverse efflux air flow 30c (see FIGS. 3, 7) in an outward direction 66 (see FIG. 3) away from the engine 16 (see FIGS. 3, 7), to produce a deflected reverse efflux air flow 30f (see FIGS. 3, 7), thereby reducing re-ingestion of the reverse efflux air flow 30c (see FIG. 7) at an air flow inlet 32 (see FIG. 3) of the engine 16 (see FIGS. 3, 7). As shown in FIG. 7, the air flow 30 may comprise intake air flow 30a (see also FIG. 3), fan air flow 30b (see also FIG. 3), reverse efflux air flow 30c (see also FIG. 3), re-ingestion reverse efflux air flow 30d (see also FIG. 3), exhaust air flow 30e (see also FIG. 3), and deflected reverse efflux air flow 30f (see also FIG. 3).

The air flow deflector assembly 10 (see FIG. 7) allows for a thrust reverser 60 (see FIG. 7) design that may provide an effective reverse thrust 126 (see FIG. 7) upon or after landing or touchdown at a high landing speed 128 (see FIG. 7) (e.g., 115-120 knots), while reducing, minimizing, or preventing re-ingestion of the reverse efflux air flow 30c (see FIG. 7) at a low landing speed (i.e., 50-60 knots). Thus, the air flow deflector assembly 10 (see FIG. 7) provides for a reduced re-ingestion 130 (see FIG. 7) and a reduced re-ingestion risk 131 (see FIG. 7). In addition, the air flow deflector assembly 10 (see FIG. 7) promotes the use of the thrust reverser 60 (see FIG. 7) and provides an increased thrust reverser use time 134 (see FIG. 7) for an effective time period 135 (see FIG. 7), such as a longer time period, at the low landing speed 132 (see FIG. 7), and preferably provides a reduced landing distance 136 (see FIG. 7) by as much as a 15% (fifteen percent) reduction.

Further, the air flow deflector assembly 10 (see FIG. 7) provides an improved thrust reverser performance 138 (see FIG. 7) of the aircraft 12a (see FIG. 7) during landing or touchdown, by deflecting or redirecting the reverse efflux air flow 30c (see FIG. 7) away from the air flow inlet 32 (see FIG. 3) of the engine 16 (see FIGS. 3, 7). Moreover, the air flow deflector assembly 10 (see FIG. 7) allows the thrust reverser 60 (see FIG. 7) and the thrust reverser system 24 (see FIG. 7) to operate from a stationary position 148 (see FIG. 7), such as when the aircraft 12a (see FIG. 7) needs to back out of an airport gate.

Figure 8:
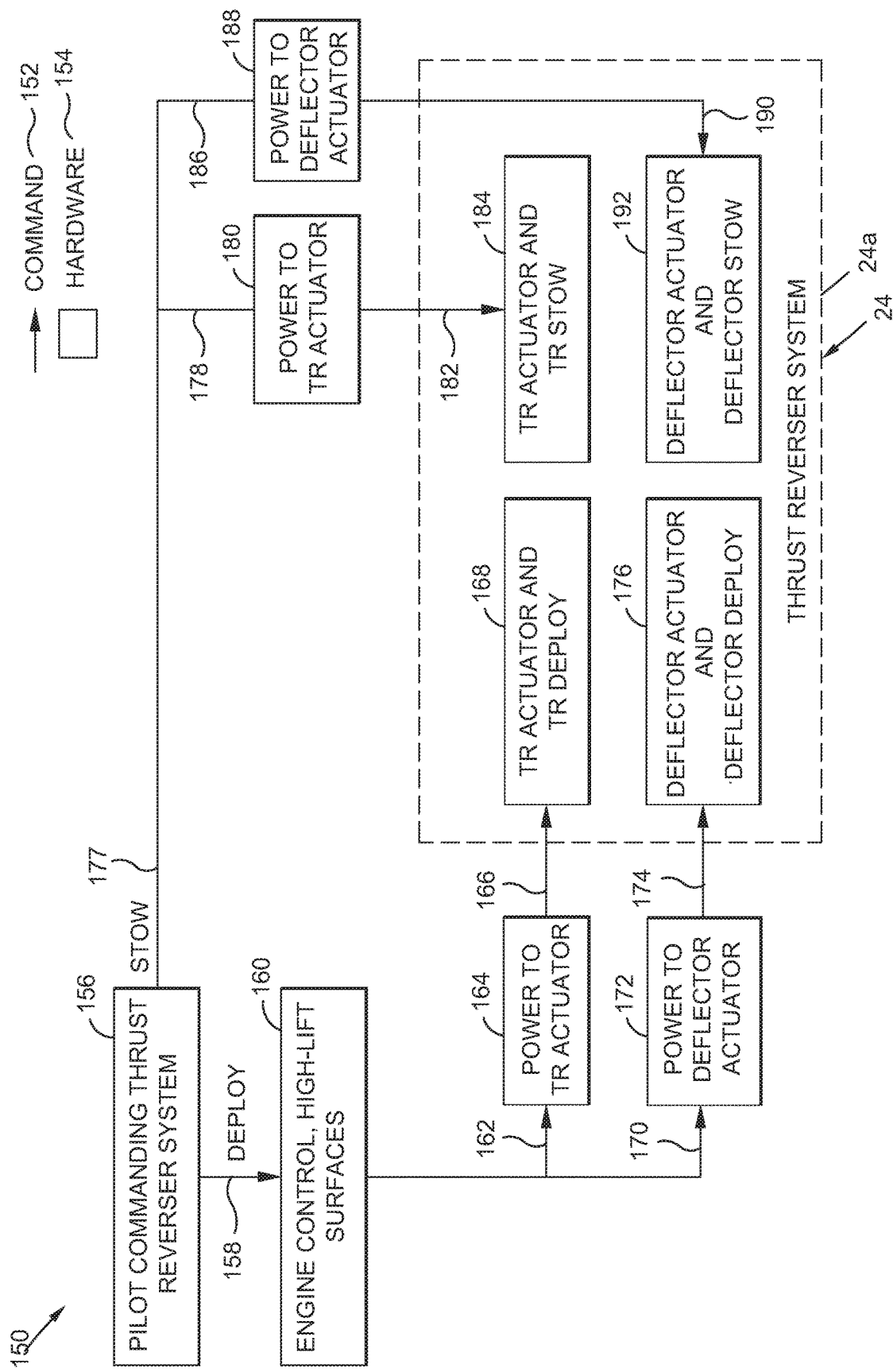
FIG. 8 is an illustration of a schematic flow diagram for a disclosed example of a re-ingestion reducing thrust reverser command and hardware scheme.

Now referring to FIG. 8, FIG. 8 is an illustration of a schematic flow diagram for a disclosed example of a re-ingestion reducing thrust reverser command and hardware scheme 150. FIG. 8 shows commands 152 and hardware 154 used in the re-ingestion reducing thrust reverser command and hardware scheme 150. As shown in FIG. 8, the re-ingestion reducing thrust reverser command and hardware scheme 150 starts with a pilot or user commanding the thrust reverser system 24, such as in the form of the re-ingestion reducing thrust reverser system 24a, with a command hardware 156, to either make a deploy command 158 or a stow command 177 for the thrust reverser actuators 58 (see FIG. 3) and the thrust reverser 60 (see FIGS. 3, 7), and the air flow deflector actuator 72 (see FIGS. 3, 5A-6B, 7) and the air flow deflector apparatus 70 (see FIGS. 3, 5A-6B, 7) of the air flow deflector assembly 10 (see FIGS. 1, 3, 5A-6B, 7).

If the deploy command 158 (see FIG. 8) is made, hardware 160 (see FIG. 8) is activated, such as for control of the engine 16 (see FIGS. 1, 3, 7), control of high-lift surfaces of the aircraft 12a (see FIGS. 1, 7), or other aircraft controls pertinent to the thrust reverser actuators 58 (see FIG. 3), the thrust reverser 60 (see FIGS. 3, 7), the air flow deflector actuator 72 (see FIGS. 3, 5A-6B, 7), and the air flow deflector apparatus 70 (see FIGS. 3, 5A-6B, 7).

As further shown in FIG. 8, a power command 162 is made to thrust reverser actuator deploy hardware 164 to provide power and control to the thrust reverser actuators 58 (see FIG. 3), and then a thrust reverser actuator actuation command 166 is made to deploy hardware 168 for the thrust reverser actuators 58 (see FIG. 3) and the thrust reverser 60 (see FIGS. 3, 7), to deploy the thrust reverser actuators 58 (see FIG. 3) and the thrust reverser 60 (see FIGS. 3, 7), of the thrust reverser system 24, such as the re-ingestion reducing thrust reverser system 24a.

As further shown in FIG. 8, a power command 170 is then be made to air flow deflector actuator deploy hardware 172 to provide power and control to the air flow deflector actuators 72 (see FIGS. 3, 5A-6B, 7), and then an air flow deflector actuator actuation command 174 is made to deploy hardware 176 for the air flow deflector actuators 72 (see FIGS. 3, 5A-6B, 7) and the air flow deflector apparatus 70 (see FIGS. 3, 5A-6B, 7), to deploy the air flow deflector actuators 72 (see FIGS. 3, 5A-6B, 7) and the air flow deflector apparatus 70 (see FIGS. 3, 5A-6B, 7), of the thrust reverser system 24, such as the re-ingestion reducing thrust reverser system 24a.

As further shown in FIG. 8, if the stow command 177 is made, a power command 178 is made to thrust reverser actuator stow hardware 180 to provide power and control to the thrust reverser actuators 58 (see FIG. 3), and then a thrust reverser actuator stow command 182 is made to stow hardware 184 for the thrust reverser actuators 58 (see FIG. 3) and the thrust reverser 60 (see FIGS. 3, 7), in order to stow the thrust reverser actuators 58 (see FIG. 3) and the thrust reverser 60 (see FIGS. 3, 7), of the thrust reverser system 24, such as the re-ingestion reducing thrust reverser system 24a.

As further shown in FIG. 8, if the stow command 177 is made, a power command 186 is then be made to air flow deflector actuator stow hardware 188 to provide power and control to the air flow deflector actuators 72 (see FIGS. 3, 5A-6B, 7), and then an air flow deflector actuator stow command 190 is made to stow hardware 192 for the air flow deflector actuators 72 (see FIGS. 3, 5A-6B, 7) and the air flow deflector apparatus 70 (see FIGS. 3, 5A-6B, 7), to stow the air flow deflector actuators 72 (see FIGS. 3, 5A-6B, 7) and the air flow deflector apparatus 70 (see FIGS. 3, 5A-6B, 7), of the thrust reverser system 24, such as the re-ingestion reducing thrust reverser system 24a.

Figure 9:
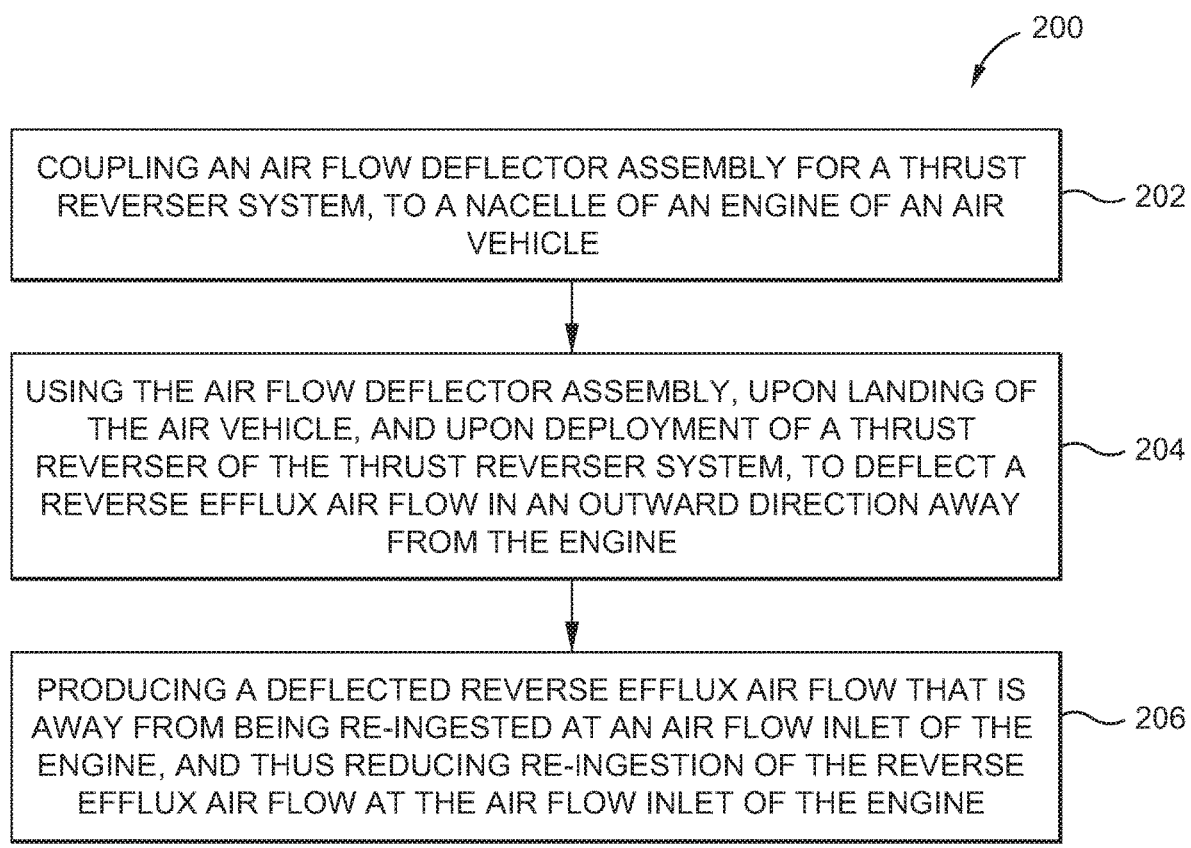
FIG. 9 is an illustration of a flow diagram showing a disclosed example of a method.

Now referring to FIG. 9, in another disclosed example, there is provided a method 200 for reducing re-ingestion of a reverse efflux air flow 30c (see FIGS. 3, 7) in an engine 16 (see FIGS. 1. 3, 7) of an air vehicle 12 (see FIGS. 1, 3, 7), such as an aircraft 12a (see FIGS. 1, 7). FIG. 9 is an illustration of a flow diagram showing a disclosed example of the method 200.

As shown in FIG. 9, the method 200 comprises the step 202 of coupling an air flow deflector assembly 10 (see FIGS. 3, 7), for a thrust reverser system 24 (see FIGS. 3, 7), to a structure 13 (see FIGS. 3, 5A-6B), such as a nacelle 14 (see FIGS. 3, 7), of the engine 16 (see FIGS. 3, 7). As discussed in detail above, the air flow deflector assembly 10 (see FIGS. 3, 7) comprises an air flow deflector apparatus 70 (see FIGS. 3, 7) movable between a stowed position 74 (see FIGS. 4C, 5A-5B), such as a stowed non-reversing position 74a (see FIGS. 4C, 7), and a deployed position 76 (see FIGS. 3, 4A, 6A-6B), such as a deployed thrust reversing position 76a (see FIGS. 3, 4A, 7).

The air flow deflector apparatus 70 (see FIGS. 3, 7) further comprises an extender member 100 (see FIGS. 3, 7) having a first end 102a (see FIGS. 5A-6B) coupled to the air flow deflector apparatus 70 (see FIGS. 3, 7). The air flow deflector apparatus 70 (see FIGS. 3, 7) further comprises a recessed housing 80 (see FIGS. 3, 7) disposed in a surface 13a (see FIG. 5A) of a structure 13 (see FIGS. 5A, 7), such as a surface 15a (see FIGS. 3, 7) of the nacelle 14 (see FIGS. 3, 7). The recessed housing 80 (see FIGS. 3, 5A-6B, 7) has an interior opening 82 (see FIGS. 5A-6B) configured to stow the air flow deflector apparatus 70 and the extender member 100 within the recessed housing 80, in the stowed position 74 (see FIGS. 4C, 5A, 7), such as the stowed non-reversing position 74a (see FIGS. 4C, 7).

The air flow deflector apparatus 70 (see FIGS. 3, 7) further comprises an air flow deflector actuator 72 (see FIGS. 3, 7) comprising an actuating portion 108 (see FIGS. 5A-6B) coupled to a second end 102b (see FIGS. 5A-6B) of the extender member 100 (see FIGS. 5A-6B) and coupled to the recessed housing 80 (see FIGS. 5A-6B), and comprising a fixed handle portion 110 (see FIGS. 5A-6B) coupled to an interior portion 13b (see FIG. 3) of the structure 13 (see FIGS. 3, 5A-6B), such as an interior portion 15b (see FIGS. 3, 7) of the nacelle 14 (see FIGS. 3, 7).

The step 202 (see FIG. 9) of coupling the air flow deflector assembly 10 (see FIGS. 3, 7) to the nacelle 14 (see FIGS. 3, 7) further comprises coupling the air flow deflector assembly 10 (see FIGS. 3, 7) at a location 68 (see FIGS. 3, 7) of the nacelle 14 (see FIGS. 3, 7) that is forward of a plurality of cascade members 62 (see FIGS. 3, 7) of the engine 16 (see FIGS. 3, 7), and that is downstream of a thrust reverser bullnose fairing 40 (see FIGS. 3, 7).

The step 202 (see FIG. 9) of coupling the air flow deflector assembly 10 (see FIGS. 3, 7) to the nacelle 14 (see FIGS. 3, 7) further comprises coupling two (2) air flow deflector assemblies 10 (see FIGS. 3, 7) to the nacelle 14, wherein the two (2) air flow deflector assemblies 10 are positioned in a circumferentially spaced apart relationship 69 (see FIGS. 1, 3) relative to each other. Alternatively, each engine 16 (see FIGS. 3, 7) and nacelle 14 (see FIGS. 3, 7) may include one (1) air flow deflector assembly 10 (see FIGS. 3, 7) for the thrust reverser system 24 (see FIGS. 3, 7), or may include another suitable number of air flow deflector assemblies 10, such as more than two (2) air flow deflector assemblies 10.

As shown in FIG. 9, the method 200 further comprises the step 204 of using the air flow deflector assembly 10 (see FIGS. 3, 7), upon landing of the air vehicle 12 (see FIGS. 1, 7), such as the aircraft 12a (see FIGS. 1, 7), and upon deployment of a thrust reverser 60 (see FIGS. 3, 7) of the thrust reverser system 24 (see FIGS. 3, 7), to deflect the reverse efflux air flow 30c (see FIGS. 3, 7) in an outward direction 66 (see FIG. 3) away from the engine 16 (see FIGS. 3, 7).

As shown in FIG. 9, the method 200 further comprises the step 206 of producing a deflected reverse efflux air flow 30f (see FIGS. 3, 7) that is away from being re-ingested at an air flow inlet 32 (see FIG. 3) of the engine 16 (see FIGS. 3, 7), and thus reducing re-ingestion of the reverse efflux air flow 30c (see FIGS. 3, 7) at the air flow inlet 32 of the engine 16.

The step 204 (see FIG. 9) of using the air flow deflector assembly 10 (see FIGS. 3, 7) to deflect the reverse efflux air flow 30c (see FIGS. 3, 7) may further comprise deploying the air flow deflector apparatus 70 (see FIGS. 3, 7) with the air flow deflector actuator 72 (see FIGS. 3, 7), to move the air flow deflector apparatus 70 from the stowed position 74 (see FIGS. 4C, 5A), such as the stowed non-reversing position 74a (see FIGS. 4C, 7), within the recessed housing 80 (see FIGS. 3, 7), to the deployed position 76 (see FIGS. 3, 4A, 6A), such as the deployed thrust reversing position 76a (see FIGS. 3, 4A, 7), adjacent to a reverse efflux air flow exit portion 43 (see FIGS. 3, 7) of the engine 16 (see FIGS. 3, 7).

The step 204 (see FIG. 9) of using the air flow deflector assembly 10 (see FIGS. 3, 7) to deflect the reverse efflux air flow 30c (see FIGS. 3, 7) may further comprise deploying the air flow deflector apparatus 70 (see FIGS. 3, 7) with the air flow deflector actuator 72 (see FIGS. 3, 7) comprising one of, a shape memory alloy (SMA) actuator 72a (see FIGS. 3, 7), an electrical actuator 72b (see FIG. 7), a pneumatic actuator 72c (see FIG. 7), a hydraulic actuator 72d (see FIG. 7), a mechanical actuator 72e (see FIG. 7), or another suitable actuator.

The step 204 (see FIG. 9) of using the air flow deflector assembly 10 (see FIGS. 3, 7) to deflect the reverse efflux air flow 30c (see FIGS. 3, 7) may further comprise using the air flow deflector assembly 10 to operate the thrust reverser 60 (see FIGS. 3, 7), such as the re-ingestion reducing thrust reverser 60a (see FIGS. 3, 7), for an effective time period 135 (see FIG. 7) to obtain a reduced landing distance 136 (see FIG. 7) of the air vehicle 12 (see FIGS. 1, 7), such as the aircraft 12a (see FIGS. 1, 7), that is reduced by at least 15% (fifteen percent).

Figure 10:
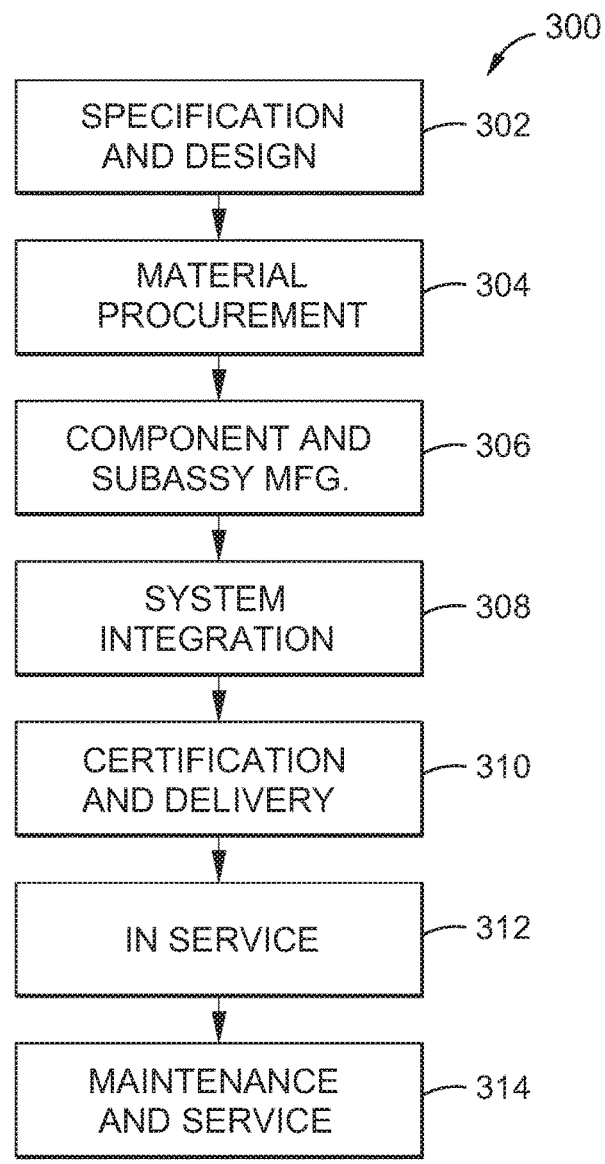
FIG. 10 is an illustration of a flow diagram of an aircraft manufacturing and service method.
Figure 11:
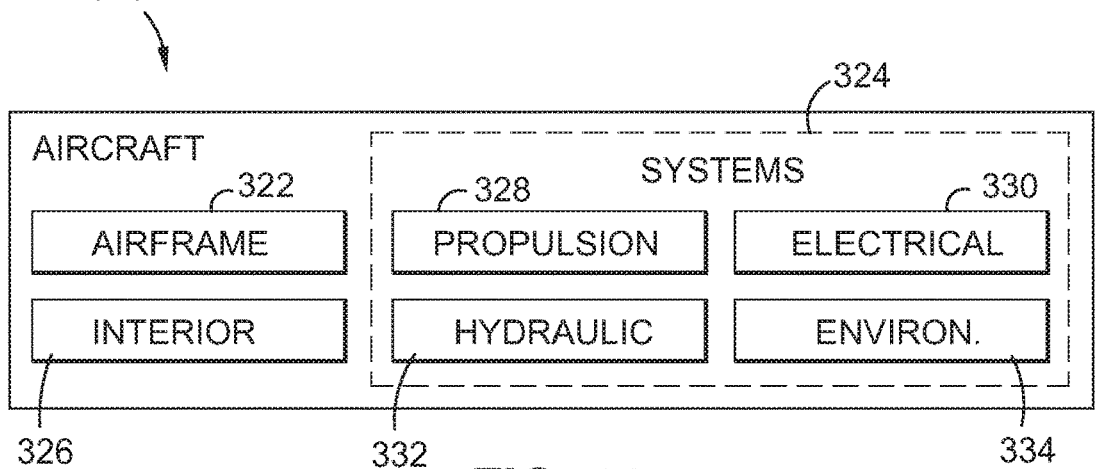
FIG. 11 is an illustration of a functional block diagram of an aircraft.

FIG. 10 is an illustration of a flow diagram of an aircraft manufacturing and service method 300. FIG. 11 is an illustration of a functional block diagram of an aircraft 320. Referring to FIGS. 10-11, examples of the disclosure may be described in the context of the aircraft manufacturing and service method 300 as shown in FIG. 10, and the aircraft 320 as shown in FIG. 11.

As shown in FIG. 10, during pre-production, exemplary aircraft manufacturing and service method 300 may include specification and design 302 of the aircraft 320 and material procurement 304. As further shown in FIG. 10, during manufacturing, component and subassembly manufacturing 306 and system integration 308 of the aircraft 320 takes place. Thereafter, the aircraft 320 may go through certification and delivery 310 (see FIG. 10) in order to be placed in service 312 (see FIG. 10). While in service 312 (see FIG. 10) by a customer, the aircraft 320 (see FIG. 11) may be scheduled for routine maintenance and service 314 (see FIG. 10) (which may also include modification, reconfiguration, refurbishment, and other suitable services).

Each of the processes of the aircraft manufacturing and service method 300 (see FIG. 10) may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 320 produced by the exemplary aircraft manufacturing and service method 300 may include an airframe 322 with a plurality of systems 324 and an interior 326. Examples of the plurality of systems 324 may include one or more of a propulsion system 328 (see FIG. 11), an electrical system 330 (see FIG. 11), a hydraulic system 332 (see FIG. 11), and an environmental system 334 (see FIG. 11). Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 10). For example, components or subassemblies corresponding to component and subassembly manufacturing 306 (see FIG. 10) may be fabricated or manufactured in a manner similar to components or subassemblies produced while the aircraft 320 (see FIG. 11) is in service 312 (see FIG. 10). Also, one or more apparatus examples, method examples, or a combination thereof, may be utilized during component and subassembly manufacturing 306 (see FIG. 10) and system integration 308 (see FIG. 10), for example, by substantially expediting assembly of or reducing the cost of the aircraft 320 (see FIG. 11). Similarly, one or more of apparatus examples, method examples, or a combination thereof, may be utilized while the aircraft 320 (see FIG. 11) is in service 312 (see FIG. 10), for example and without limitation, to maintenance and service 314 (see FIG. 10).

Examples of the air flow deflector assembly 10 (see FIGS. 3, 5A-6B, 7) for the thrust reverser system 24 (see FIGS. 3, 7), such as the re-ingestion reducing thrust reverser system 24a (see FIGS. 3, 7), the vehicle 11 (see FIG. 7), such as the air vehicle 12 (see FIGS. 1, 7), for example, the aircraft 12a (see FIGS. 1, 7), having the air flow deflector assembly 10 (see FIGS. 1, 3, 5A-6B, 7), and the method 200 (see FIG. 9) allow for a thrust reverser 60 (see FIG. 7) design that may provide an effective reversed thrust 126 (see FIG. 7), upon or after landing or touchdown at a high landing speed 128 (see FIG. 7) (e.g., 115-120 knots), while reducing, minimizing, or preventing re-ingestion of the reverse efflux air flow 30c (see FIG. 7) at a low landing speed (e.g., 50-60 knots). Thus, the air flow deflector assembly 10 (see FIG. 7) provides for a reduced re-ingestion 130 (see FIG. 7) and a reduced re-ingestion risk 131 (see FIG. 7). Further, the air flow deflector assembly 10 (see FIG. 7) provides a thrust reverser design with an elevated reverse thrust level that otherwise cannot be achieved without a re-ingestion risk.

In addition, examples of the air flow deflector assembly 10 (see FIGS. 3, 5A-6B, 7) for the thrust reverser system 24, such as the re-ingestion reducing thrust reverser system 24a (see FIGS. 3, 7), the air vehicle 12 (see FIGS. 1, 7), such as the aircraft 12a (see FIGS. 1, 7), having the air flow deflector assembly 10 (see FIGS. 1, 3, 5A-6B, 7), and the method 200 (see FIG. 9) promote the use of the thrust reverser 60 (see FIG. 7) and provide an increased thrust reverser use time 134 (see FIG. 7) for an effective time period 135 (see FIG. 7), such as a longer time period, at the low landing speed 132 (see FIG. 7), and preferably provide a reduced landing distance 136 (see FIG. 7) by as much as a 15% (fifteen percent) reduction. For example, a preliminary estimation indicates that by operating the thrust reverser 60 (see FIG. 7) from 120 knots to 50 knots, instead of from 120 knots to 60 knots, the landing distance may be shortened or reduced by approximately 15%.

Moreover, examples of the air flow deflector assembly 10 (see FIGS. 3, 5A-6B, 7) for the thrust reverser system 24, such as the re-ingestion reducing thrust reverser system 24a (see FIGS. 3, 7), the air vehicle 12 (see FIGS. 1, 7), such as the aircraft 12a (see FIGS. 1, 7), having the air flow deflector assembly 10 (see FIGS. 1, 3, 5A-6B, 7), and the method 200 (see FIG. 9) provide for an improved cascade member design 140 (see FIG. 7) that preferably results in a reduced number 142 (see FIG. 7) of unique cascade members 62b (see FIG. 7). For example, the air flow deflector assembly 10 (see FIG. 7) may reduce the number of unique cascade members 62b (see FIG. 7) needed by the engine 16 (see FIG. 7) by one or two unique cascade members 62b (see FIG. 7). Because the number of unique cascade members 62b (see FIG. 7) is reduced, this may result in a decrease in the length and weight of the engine 16 (see FIG. 7), and, in turn, may result in a reduced nacelle length 144 (see FIG. 7) and a reduced nacelle weight 146 (see FIG. 7) of the nacelle 14 (see FIG. 7). A shortened nacelle 14 (see FIGS. 3, 7) has less weight, and therefore, less drag. The air flow deflector assembly 10 (see FIGS. 3, 5A-6B, 7) allows a more effective cascade member 62 (see FIG. 7) design with a more efficient and shorter nacelle 14 (see FIG. 7), in terms of weight savings, less drag, and less unique cascade members 62b (see FIG. 7) with similar turning angles 64 (see FIG. 4B), due to the relaxation of design constraints. Further, the reduced nacelle weight 146 (see FIG. 7) may improve the overall thrust reverser design to enable the carriage of more cargo by the aircraft 12a (see FIGS. 1, 7).

In addition, the air flow deflector assembly 10 (see FIG. 7) allows the thrust reverser 60 (see FIG. 7) and the thrust reverser system 24 (see FIG. 7) to operate from a stationary position 148 (see FIG. 7), such as when the aircraft 12a (see FIG. 7) needs to back out of an airport gate. Further, the air flow deflector assembly 10 (see FIG. 7) provides an improved thrust reverser performance 138 (see FIG. 7) of the aircraft 12a (see FIG. 7) upon or after landing or touchdown, by deflecting or redirecting the reverse efflux air flow 30c (see FIG. 7) away from the air flow inlet 32 (see FIG. 3) of the engine 16 (see FIGS. 3, 7).

Moreover, examples of the air flow deflector assembly 10 (see FIGS. 3, 5A-6B, 7) for the thrust reverser system 24, such as the re-ingestion reducing thrust reverser system 24a (see FIGS. 3, 7), the air vehicle 12 (see FIGS. 1, 7), such as the aircraft 12a (see FIGS. 1, 7), having the air flow deflector assembly 10 (see FIGS. 1, 3, 5A-6B, 7), and the method 200 (see FIG. 9) provide an improved thrust reverser performance 138 (see FIG. 7) on a runway for near airport operations by deploying the air flow deflector apparatus 70 (see FIGS. 5A-6B, 7) via the air flow deflector actuator 72 (see FIGS. 5A-6B, 7), such as in the form of a shape memory alloy (SMA) actuator 72a (see FIGS. 5A-6B, 7), just forward of the thrust reverser 60 (see FIGS. 3, 7) and the cascade vanes 62a (see FIGS. 3, 7).

Many modifications and other examples of the disclosure will come to mind to one skilled in the art to which this disclosure pertains having the benefit of the teachings presented in the foregoing descriptions and the associated drawings. The examples described herein are meant to be illustrative and are not intended to be limiting or exhaustive. Although specific terms are employed herein, they are used in a generic and descriptive sense only and not for purposes of limitation.

What is claimed is:

1. An air flow deflector assembly for a thrust reverser system of an engine of an air vehicle, the air flow deflector assembly comprising:
   an air flow deflector apparatus movable between a stowed non-reversing position and a deployed thrust reversing position, wherein the air flow deflector apparatus comprises a deflector barrier panel configured to block a reverse efflux air flow;
   one or more extender rods, each having a first end coupled to the air flow deflector apparatus;
   a recessed housing disposed in a surface of a nacelle of the engine, the recessed housing having a length that is greater than a combination of a length of the air flow deflector apparatus and a length of the one or more extender rods; and
   an air flow deflector actuator comprising an actuating portion coupled to a second end of each of the one or more extender rods and coupled to the recessed housing,
   wherein the air flow deflector assembly is configured to deflect an air flow out of the engine, and to provide an effective reverse thrust for the thrust reverser system, and further wherein the air flow deflector assembly is positioned at a location of the nacelle that is forward of a plurality of cascade members of the engine, and that is downstream of a thrust reverser bullnose fairing.

2. The air flow deflector assembly of claim 1, wherein the recessed housing has an interior channel opening, and the one or more extender rods and the air flow deflector apparatus are coupled together in a colinear arrangement and stowed in the stowed non-reversing position within the interior channel opening.

3. The air flow deflector assembly of claim 1, wherein the air flow deflector actuator moves the air flow deflector apparatus between the stowed non-reversing position within the recessed housing, and the deployed thrust reversing position adjacent to a reverse efflux air flow exit portion of the engine.

4. The air flow deflector assembly of claim 1, wherein the air flow deflector actuator comprises one of a shape memory alloy (SMA) actuator, an electrical actuator, a pneumatic actuator, a hydraulic actuator, and a mechanical actuator.

5. The air flow deflector assembly of claim 1, wherein upon landing of the air vehicle, the air flow deflector apparatus deflects the reverse efflux air flow in an outward direction away from the engine, to produce a deflected reverse efflux air flow that is away from being re-ingested at an air flow inlet of the engine.

6. The air flow deflector assembly of claim 1, wherein the deflector barrier panel has a substantially rectangular shape.

7. An air flow deflector assembly for a structure, the air flow deflector assembly comprising:
- an air flow deflector apparatus movable between a stowed position and a deployed position, wherein the air flow deflector apparatus comprises a deflector barrier panel configured to block a reverse efflux air flow;
- one or more extender members, each having a first end coupled to the air flow deflector apparatus;
- a recessed housing disposed in a surface of the structure, the recessed housing having an interior channel opening configured to stow the air flow deflector apparatus and the one or more extender members coupled together in a collinear arrangement within the interior channel opening of the recessed housing, and wherein the recessed housing has a length that is greater than a combination of a length of the air flow deflector apparatus and a length of the one or more extender members; and
- an air flow deflector actuator comprising an actuating portion coupled to a second end of each of the one or more extender members and coupled to the recessed housing, and comprising a fixed handle portion coupled to an interior portion of the structure, wherein the air flow deflector actuator moves the air flow deflector apparatus between the stowed position within the recessed housing, and the deployed position adjacent to a reverse efflux air flow exit portion of the structure,
- wherein the air flow deflector apparatus, the one or more extender members, the recessed housing, and the air flow deflector actuator are assembled to form the air flow deflector assembly for the structure, and further wherein, the air flow deflector assembly is configured to deflect the reverse efflux air flow away from being re-ingested into the structure, and further wherein the air flow deflector assembly is positioned at a location of the structure, the structure comprising a nacelle of an engine, that is forward of a plurality of cascade members of the engine, and that is downstream of a thrust reverser bullnose fairing.

8. The air flow deflector assembly of claim 7, wherein the air flow deflector apparatus has a curved shape.

9. The air flow deflector assembly of claim 7, wherein the length of the air flow deflector apparatus is in a range of about 0.1 inch to about 24 inches.

10. The air flow deflector assembly of claim 7, wherein the air flow deflector apparatus deflects the reverse efflux air flow in an outward direction away from the structure, to produce a deflected reverse efflux air flow that is away from being re-ingested into the structure.

11. The air flow deflector assembly of claim 7, wherein the interior channel opening of the recessed housing comprises a longitudinal U-shaped interior channel opening having a length that is greater than the combination of the length of the air flow deflector apparatus and the length of the one or more extender members.

12. The air flow deflector assembly of claim 7, wherein the air flow deflector actuator is comprised of a shape memory alloy (SMA) material, and is coupled to a heating element configured to heat the SMA material for actuation.

13. The air flow deflector assembly of claim 7, wherein the air flow deflector actuator comprises one of a shape memory alloy (SMA) actuator, an electrical actuator, a pneumatic actuator, a hydraulic actuator, and a mechanical actuator.

14. The air flow deflector assembly of claim 7, wherein the structure comprises the nacelle of a thrust reverser system of the engine of an air vehicle.

15. The air flow deflector assembly of claim 7, wherein the air flow deflector assembly reduces a number of unique cascade members needed by the structure.

16. An air vehicle having one or more air flow deflector assemblies for reducing re-ingestion of a reverse efflux air flow, the air vehicle comprising:
- a fuselage;
- at least one wing connected to the fuselage;
- at least one engine coupled to the at least one wing, the at least one engine having a nacelle and having the one or more air flow deflector assemblies for a thrust reverser system, each of the one or more air flow deflector assemblies comprising:
  - an air flow deflector apparatus movable between a stowed non-reversing position and a deployed thrust reversing position, wherein the air flow deflector apparatus comprises a deflector barrier panel configured to block the reverse efflux air flow;
  - an extender member having a first end coupled to the air flow deflector apparatus;
  - a recessed housing disposed in a surface of the nacelle, the recessed housing having an interior channel opening configured to stow the air flow deflector apparatus and the extender member in the stowed non-reversing position within the interior channel opening of the recessed housing, and wherein the recessed housing has a length that is greater than a combination of a length of the air flow deflector apparatus and a length of the extender member; and
  - an air flow deflector actuator comprising an actuating portion coupled to a second end of the extender member and coupled to the recessed housing, and comprising a fixed handle portion coupled to an interior portion of the nacelle, wherein the air flow deflector actuator moves the air flow deflector apparatus between the stowed non-reversing position within the recessed housing, and the deployed thrust reversing position adjacent to a reverse efflux air flow exit portion of the engine,
- wherein when the air flow deflector apparatus is in the deployed thrust reversing position, upon landing of the air vehicle, the air flow deflector apparatus deflects the reverse efflux air flow in an outward direction away from the at least one engine, to produce a deflected reverse efflux air flow, thereby reducing re-ingestion of the reverse efflux air flow at an air flow inlet of the at least one engine, and further wherein each of the one or more air flow deflector assemblies is positioned at a location of the nacelle that is forward of a plurality of cascade members of the at least one engine, and that is downstream of a thrust reverser bullnose fairing.

17. The air vehicle of claim 16, wherein the one or more air flow deflector assemblies comprises two air flow deflector assemblies positioned in a circumferentially spaced apart relationship relative to each other.

18. The air vehicle of claim 16, wherein the air flow deflector actuator comprises one of a shape memory alloy (SMA) actuator, an electrical actuator, a pneumatic actuator, a hydraulic actuator, and a mechanical actuator.

19. The air vehicle of claim 16, wherein the deflector barrier panel has a substantially rectangular shape.

20. The air vehicle of claim 16, wherein the one or more air flow deflector assemblies reduces a number of unique cascade members needed by the at least one engine.

21. A method for reducing re-ingestion of a reverse efflux air flow in an engine of an air vehicle, the method comprising the steps of:

coupling one or more air flow deflector assemblies, for a thrust reverser system, to a nacelle of the engine, at a location of the nacelle that is forward of a plurality of cascade members of the engine, and that is downstream of a thrust reverser bullnose fairing, each of the one or more air flow deflector assemblies comprising:
- an air flow deflector apparatus movable between a stowed non-reversing position and a deployed thrust reversing position, wherein the air flow deflector apparatus comprises a deflector barrier panel configured to block the reverse efflux air flow;
- an extender member having a first end coupled to the air flow deflector apparatus;
- a recessed housing disposed in a surface of the nacelle, the recessed housing having an interior channel opening configured to stow the air flow deflector apparatus and the extender member in the stowed non-reversing position within the interior channel opening of the recessed housing, and wherein the recessed housing has a length that is greater than a combination of a length of the air flow deflector apparatus and a length of the extender member; and
- an air flow deflector actuator comprising an actuating portion coupled to a second end of the extender member and coupled to the recessed housing, and comprising a fixed handle portion coupled to an interior portion of the nacelle;

using the one or more air flow deflector assemblies, upon landing of the air vehicle, and upon deployment of a thrust reverser of the thrust reverser system, to deflect the reverse efflux air flow in an outward direction away from the engine; and producing a deflected reverse efflux air flow that is away from being re-ingested at an air flow inlet of the engine, and thus reducing re-ingestion of the reverse efflux air flow at the air flow inlet of the engine.

22. The method of claim 21, wherein coupling the one or more air flow deflector assemblies to the nacelle further comprises, coupling the one or more air flow deflector assemblies, wherein each of the one or more air flow deflector assemblies comprises the air flow deflector apparatus comprising the deflector barrier panel having a substantially rectangular shape.

23. The method of claim 21, wherein coupling the one or more air flow deflector assemblies to the nacelle further comprises, coupling the one or more air flow deflector assemblies comprising two air flow deflector assemblies, to the nacelle, wherein the two air flow deflector assemblies are positioned in a circumferentially spaced apart relationship relative to each other.

24. The method of claim 21, wherein using the one or more air flow deflector assemblies to deflect the reverse efflux air flow further comprises, deploying the air flow deflector apparatus with the air flow deflector actuator, to move the air flow deflector apparatus from the stowed non-reversing position within the recessed housing, to the deployed thrust reversing position adjacent to a reverse efflux air flow exit portion of the engine.

25. The method of claim 24, wherein using the one or more air flow deflector assemblies to deflect the reverse efflux air flow further comprises, deploying the air flow deflector apparatus with the air flow deflector actuator comprising one of a shape memory alloy (SMA) actuator, an electrical actuator, a pneumatic actuator, a hydraulic actuator, and a mechanical actuator.

26. The method of claim 21, wherein coupling the one or more air flow deflector assemblies to the nacelle further comprises, coupling the one or more air flow deflector assemblies each comprising the recessed housing having the interior channel opening comprising a longitudinal U-shaped interior channel opening having a length that is greater than the combination of the length of the air flow deflector apparatus and the length of the extender member.

* * * * *